US010822190B2

(12) United States Patent
Pasqualoni

(10) Patent No.: US 10,822,190 B2
(45) Date of Patent: Nov. 3, 2020

(54) UNWINDING ASSEMBLY AND METHOD FOR AUTOMATICALLY LOADING REELS INTO AN UNWINDING ASSEMBLY

(71) Applicant: Fameccanica.Data S.p.A., San Giovanni Teatino (IT)

(72) Inventor: Paolo Pasqualoni, Sambuceto di San Giovanni Teatino (IT)

(73) Assignee: FAMECCANICA.DATA S.P.A., San Giovanni Teatino (IT)

( * ) Notice: Subject to any disclaimer, the term of this patent is extended or adjusted under 35 U.S.C. 154(b) by 145 days.

(21) Appl. No.: 16/011,558

(22) Filed: Jun. 18, 2018

(65) Prior Publication Data

US 2018/0362280 A1    Dec. 20, 2018

(30) Foreign Application Priority Data

Jun. 20, 2017   (IT) .................. 102017000068588
Jun. 20, 2017   (IT) .................. 102017000068667

(51) Int. Cl.
*B65H 19/12*       (2006.01)
*B65H 16/04*       (2006.01)
(Continued)

(52) U.S. Cl.
CPC ........... *B65H 19/123* (2013.01); *B29C 65/02* (2013.01); *B29C 65/7841* (2013.01); *B29C 66/1122* (2013.01); *B29C 66/43* (2013.01); *B29C 66/81419* (2013.01); *B29C 66/836* (2013.01); *B29C 66/853* (2013.01); *B65H 16/021* (2013.01); *B65H 16/04* (2013.01); *B65H 16/103* (2013.01); *B65H 19/1805* (2013.01);
(Continued)

(58) Field of Classification Search
CPC .............. B65H 19/123; B65H 19/1805; B65H 19/1852; B65H 19/12; B65H 2555/31
See application file for complete search history.

(56) References Cited

U.S. PATENT DOCUMENTS 2,268,887 A * 1/1942 Matteson ................. B21C 47/34
242/592
3,836,089 A * 9/1974 Riemersma ............ B65H 19/14
242/417.3
(Continued)

FOREIGN PATENT DOCUMENTS

EP      1277683 A1    1/2003
EP      2862823 A1    4/2015
WO   2015097364 A1    7/2015

OTHER PUBLICATIONS

Italian Search Report and Written Opinion dated Mar. 22, 2018 for Application No. 102017000068667.
(Continued)

*Primary Examiner* — Michael E Gallion
(74) *Attorney, Agent, or Firm* — Patterson + Sheridan, LLP

(57) ABSTRACT

An unwinding assembly comprising first and second unwinding and handling units comprising respective robots having respective wrists movable under the control of at least one electronic control unit, wherein each of said unwinding and handling units comprises a respective unwinding device mounted on the wrist of the respective robot. The present invention also relates to an unwinding and handling unit capable of handling the reel carried by it with high freedom of movement, while maintaining small dimensions.

8 Claims, 15 Drawing Sheets

(51) Int. Cl.
*B65H 16/10* (2006.01)
*B65H 75/24* (2006.01)
*B29C 65/02* (2006.01)
*B29C 65/78* (2006.01)
*B29C 65/00* (2006.01)
*B65H 19/18* (2006.01)
*B65H 16/02* (2006.01)
*B29C 65/50* (2006.01)
*B29C 65/74* (2006.01)
*B29C 65/08* (2006.01)
*B29L 31/48* (2006.01)
*B29C 65/52* (2006.01)
*B29C 65/56* (2006.01)

(52) U.S. Cl.
CPC ....... B65H 19/1852 (2013.01); B65H 75/242 (2013.01); *B29C 65/08* (2013.01); *B29C 65/5057* (2013.01); *B29C 65/52* (2013.01); *B29C 65/56* (2013.01); *B29C 65/74* (2013.01); *B29C 66/71* (2013.01); *B29C 66/7294* (2013.01); *B29C 66/8362* (2013.01); *B29L 2031/4878* (2013.01); *B65H 2301/4634* (2013.01); *B65H 2301/46115* (2013.01); *B65H 2301/46176* (2013.01); *B65H 2553/42* (2013.01); *B65H 2553/51* (2013.01); *B65H 2555/31* (2013.01); *B65H 2701/1752* (2013.01); *B65H 2801/57* (2013.01)

(56) References Cited

U.S. PATENT DOCUMENTS

| | | | | |
|---|---|---|---|---|
| 4,331,418 A * | 5/1982 | Klebe | ............... | B66F 9/07 414/277 |
| 4,588,344 A * | 5/1986 | Burke | ............... | B65H 19/102 242/559.3 |
| 4,726,725 A * | 2/1988 | Baker | ............... | B65G 1/0435 414/283 |
| 5,305,652 A * | 4/1994 | Zimmer | ............... | B25J 9/047 74/490.01 |
| 5,495,990 A * | 3/1996 | Tamura | ............... | B65H 54/34 242/475.7 |
| 6,354,644 B1 * | 3/2002 | Zaguroli, Jr. | ............... | B65H 19/123 294/67.22 |
| 6,731,091 B2 * | 5/2004 | Hietmann | ............... | B25J 19/0054 318/563 |
| 6,767,318 B2 * | 7/2004 | Spatafora | ............... | B65H 19/123 242/554 |
| 7,350,740 B2 * | 4/2008 | Benvenuti | ............... | B65H 19/126 242/555.1 |
| 7,984,603 B2 * | 7/2011 | Freudenberg | ............... | B65H 19/123 242/559 |
| 8,219,245 B2 * | 7/2012 | Merk | ............... | B25J 9/102 318/568.24 |
| 2004/0042789 A1 * | 3/2004 | Puffer, Jr. | ............... | B01D 65/00 396/599 |
| 2005/0161161 A1 * | 7/2005 | Sharp | ............... | B65H 21/00 156/353 |
| 2006/0051185 A1 * | 3/2006 | Spatafora | ............... | B65H 16/04 414/222.01 |
| 2006/0182595 A1 * | 8/2006 | Lundstrom | ............... | B25J 9/0009 414/695.8 |
| 2010/0047050 A1 * | 2/2010 | Barsacchi | ............... | B25J 15/0616 414/684 |
| 2013/0056576 A1 * | 3/2013 | Andrews | ............... | A61F 13/15577 242/560 |
| 2015/0090831 A1 * | 4/2015 | Huber | ............... | B65H 19/1873 242/555.3 |
| 2016/0060060 A1 * | 3/2016 | Macura | ............... | B65H 16/04 242/558 |
| 2017/0073182 A1 * | 3/2017 | Macura | ............... | B65H 16/10 |
| 2017/0101281 A1 * | 4/2017 | Follen | ............... | B65H 19/123 |
| 2017/0233206 A1 * | 8/2017 | Wimmer | ............... | B65H 19/12 242/554 |
| 2018/0141772 A1 * | 5/2018 | Prankl | ............... | B65H 19/12 |
| 2019/0106212 A1 * | 4/2019 | Furukawa | ............... | B64F 3/00 |

OTHER PUBLICATIONS

Italian Search Report and Written Opinion dated Mar. 22, 2018 for Application No. 102017000068588.

* cited by examiner

UNWINDING ASSEMBLY AND METHOD FOR AUTOMATICALLY LOADING REELS INTO AN UNWINDING ASSEMBLY

CROSS-REFERENCE TO RELATED APPLICATIONS

This application claims benefit of Italian patent application number 102017000068667, filed Jun. 20, 2017 and Italian patent application number 102017000068588, filed Jun. 20, 2017 which is herein incorporated by reference.

BACKGROUND OF THE INVENTION

Field of the Invention

The present invention relates to unwinding assemblies used to unwind continuous webs wound in reels and to feed the aforesaid webs to operating machines in a feed direction. The present invention also refers to an unwinding and handling unit able to unwind and handle a reel with a great freedom of movement and to have reduced dimensions.

In one or more embodiments, the invention relates to a method for automatically loading reels into an unwinding assembly.

The invention has been developed, in particular, regarding the application in machines for producing absorbent sanitary products.

Description of Prior Art

In machines for producing absorbent sanitary products, there is a general requirement to pick up web materials from reels on which these materials are wound.

Modern machines for producing absorbent sanitary products operate at increasingly higher speeds, so that the speed of unwinding of the web materials from the reels tends to become faster and faster, increasing the frequency of replacing the finished reels with new reels.

Replacing a finished reel with a new reel requires a series of operations, including picking up a new reel located at a storage station and loading the reel onto an unwinder assembly.

These operations tend to occur at increasingly shorter intervals as the operating speed of the machines increases, so that these operations need to be performed as quickly and efficiently as possible.

EP-A-1277683, by the same Applicant, describes an unwinding assembly that automatically performs the operations of preparing and joining a tail section of a web wound onto a reel about to finish with a head section of a new reel. This unwinding assembly involves dispensing pieces of adhesive tape onto a gripping element consisting of a rotating drum. The drum applies the adhesive element onto the outer surface of a reel, so as to establish an adhesive connection with the web wound thereon. Due to a relative movement between the drum and the reel, the web forms a loop separated from the reel, which can be subjected to a cut with the consequent formation of a free edge. An additional adhesive element is subsequently applied onto the web, which is used to connect the free end of the web with the tail section of a web coming from a reel in the process of finishing.

The solution described in the document EP-A-1277683 involves the need to carry out a large number of operations aimed at obtaining the junction between the tail section of the web coming from the reel about to finish with the head section of the new reel, which must all be carried out in a precise and coordinated manner. The high number of operations increases the risk of malfunctions, which may require the intervention of operators and the slowing down of the reel-change operation, which could also cause the machine to stop.

The solution described in the document EP-A-1277683 for joining the tail section of the web coming from the reel about to finish with the head section of the new reel favors the use of an adhesive tape that, as is well known by the skilled person, may cause jamming of the web and is a source of contamination of the apparatus constituting the productive process.

Furthermore, the document EP-A-1277683 does not give any indication regarding the handling and positioning operations of the reels, always implying an intervention by the operator.

The document US-A-2016/060060 describes a handling unit for reels that can be used in an unwinding assembly.

This handling unit is provided with an unwinding device comprising a motion transmission mechanism that transmits the rotation generated by a motor to the spindle of the unwinding device.

However, this mechanism is very cumbersome; it has several components that complicate its maintenance and assembly operations, and considerably limits the possible movements of the reel.

The provision of an unwinding and handling unit, and an unwinding assembly comprising said unit is, therefore, required that, in view of replacing the finished reels with the new reels in an unwinding assembly, can automatically perform the handling operations of the reels in the simplest and most efficient way possible, reducing the risk of malfunctions, guaranteeing high freedom in handling the reels and considerably reducing the dimensions of the unwinding device of the unwinding and handling unit.

SUMMARY OF THE INVENTION

The present invention aims to provide an unwinding assembly and a method for automatically loading reels onto an unwinding assembly that satisfies the aforesaid needs and overcomes the problems of the prior art.

According to the present invention, this object is achieved by an unwinding and handling unit, an unwinding assembly and by a method having the characteristics forming the subject of claims 1, 7 and 8. The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that, for greater clarity of illustration, the parts visible in the figures are not necessarily represented to scale.

DETAILED DESCRIPTION

In the following description various specific details are illustrated aimed at a thorough understanding of examples of one or more embodiments. The embodiments may be implemented without one or more of the specific details, or with other methods, components, materials, etc. In other cases, known structures, materials or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references used here are only for convenience and do not therefore define the field of protection or the scope of the embodiments.

In the following discussion, the terms "tape", "sheet" or "web" mean a strip of flexible material that has much larger dimensions of length and width than the thickness.

Tape materials are typically supplied in rolls or reels 10, which are formed by winding the web material 12 around a rigid core 13, which is typically a cardboard cylinder provided with a typically cylindrical central opening 54. Examples of web materials are nonwoven fabrics or polyethylene films.

The geometric dimensions that characterize a reel are the width L, the outer diameter D (which is proportional to the length of web material wound around the reel) and the inner diameter d of the central opening 54 of the cardboard core 13.

Figure 13:
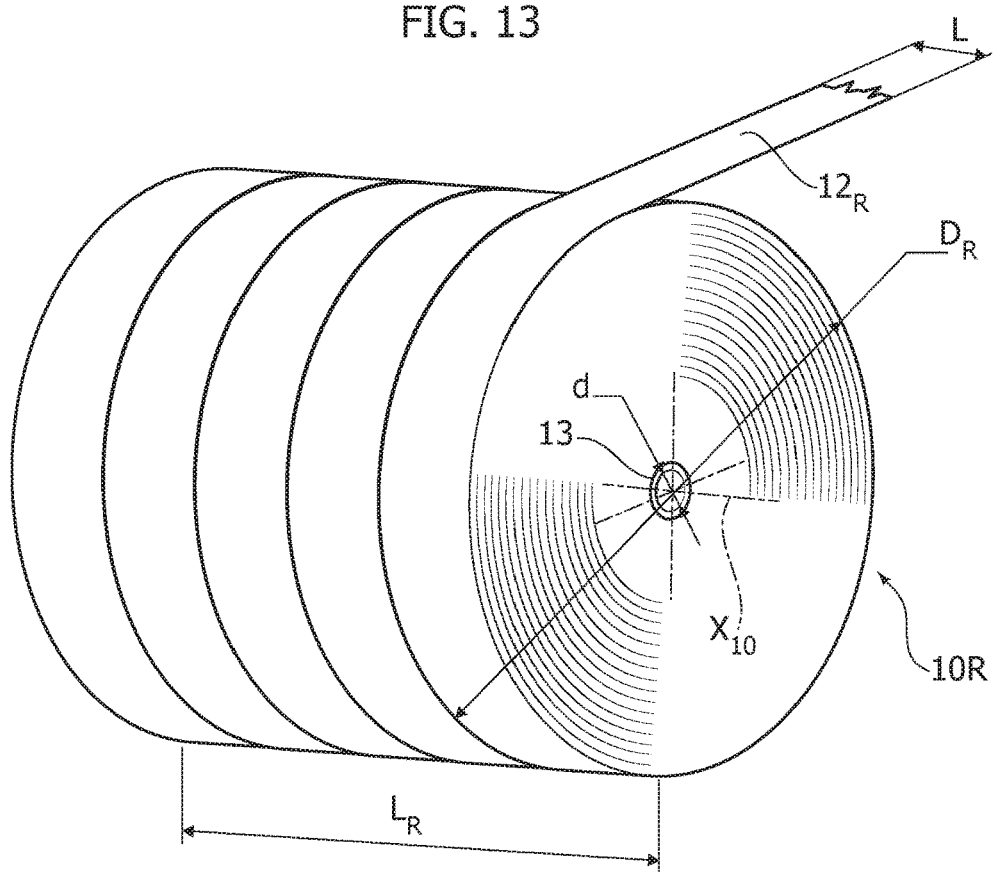

In cases where thicker web materials are required such as, for example, nonwoven "High Loft" material, commonly used in the production of absorbent structures of sanitary articles, in order to always have quantities of web material in such a way as not to be forced to make reel replacements at very short time intervals, it is standard practice to produce the reels as shown in FIG. 13, in which the web material 12R is wound in side-by-side turns around a core 13 of length LR greater than the width L of the web material 12R itself. Reels of this type are also called spools.

Figure 12:
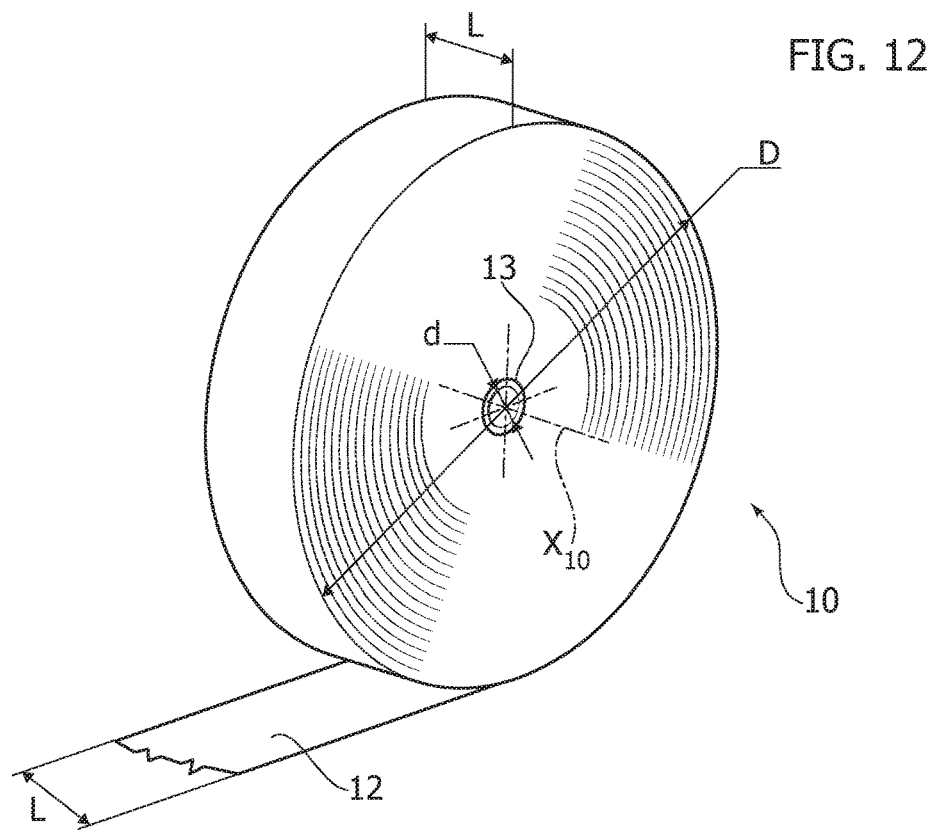
FIGS. 12 and 13 are perspective views illustrating two types of the most widely used reels.

In the remainder of the text, for the sake of simplicity, but without removing generality from the discussion, reference will only be made to reels of the first type, i.e. of the type represented in FIG. 12, or rather that have a width L coinciding with that of the wound web material.

Given the alternating nature of the process, the description of the embodiments refers to the situation represented in the attached drawings, which represent the replacement of a finished reel called, in fact, first reel 10', with a new reel, said second reel 10", similarly the equipment such as, for example, the unwinding and handling units have been identified as the first unwinding and handling unit 34' and the second unwinding and handling unit 34" as a function of the reel that they process in the attached drawings. It is obvious that due to the cyclicity of the process, the roles of the reels and the equipment are continuously inverted, since a new reel replaces a finished one and—subsequently—it will also be finished and will, in turn, be replaced. Therefore, the references "first" and "second" are to be understood only at the indicative level and do not remove generality from the discussion.

The present invention refers to an unwinding and handling unit 34' of a reel 10' containing a web 12' intended to feed a production machine M.

The unwinding and handling unit 34' comprises a robot 35' provided with a wrist 38' and an unwinding device 40' mounted on the wrist 38', wherein the unwinding device 40' comprises an unwinding shaft 44' rotatable about an axis C driven by an electric motor 47'.

According to one aspect of the present invention, the electric motor 47' has a rotation axis perpendicular to the axis C. This makes it possible to considerably reduce the dimensions of the unwinding device 40' with respect to the prior art and to have greater freedom of movement of the reel 10', since the electric motor 47' is positioned so as to allow movements with the wrist 38' that have not been allowed up to now with known solutions.

According to possible embodiments, the unwinding shaft 44' comprises a plurality of mobile expansion elements 51' projecting from an outer surface 55' of the unwinding shaft and configured to move outwards by means of pressurized air.

In accordance with possible embodiments, the unwinding device 40' comprises an encoder 49' that detects the angular position and the instantaneous speed of the unwinding shaft 44'.

According to possible embodiments, the robot 35' is an anthropomorphic robot.

In accordance with possible embodiments, the unwinding and handling unit 34' comprises a vision device 50' configured to acquire images usable by the control unit 70.

Embodiments of the present invention also relate to an unwinding assembly 30 for feeding a production machine M by means of a web 12' coming from a reel 10'.

According to one aspect of the present invention, the unwinding assembly 30 comprises at least one unwinding and handling unit 34' of the reel 10' according to any of the embodiments described.

FIGS. 1-5 indicate a first 10' and a second 10" reel, containing a first web 12' and a second web 12", respectively. The reels 10', 10" are mounted on the shafts 44' and 44" of the respective unwinding and handling units 34' and 34".

FIGS. 1-5 schematically represent a method for automatically joining the tail section 12't of a first web 12' of a first reel 10' about to finish with the head section 12"h of a second web 12" of a second new reel 10", implemented in an unwinding assembly 30.

As the skilled person knows, in many cases, the reels must have a well-defined direction of unwinding, such as, for example, when a production machine M with a printed material is to be fed, in which case it is important that the web is sent to the production machine M with the inner and outer surfaces always facing the same direction. Typically, the inner surface of a web means the surface facing towards the central core of the reel while, on the contrary, the outer surface means the surface of the web facing outwards.

In these cases, the unwinding direction must be the same for both reels and, therefore, must be unwound by rotating them in a defined direction that depends on the raw material itself, and this direction may be clockwise or anticlockwise.

FIGS. 1-9 represent a method in which the reels are unwound by rotating them anticlockwise (for the viewer) in order to always have the inner surfaces of the webs facing upwards.

Figure 14:
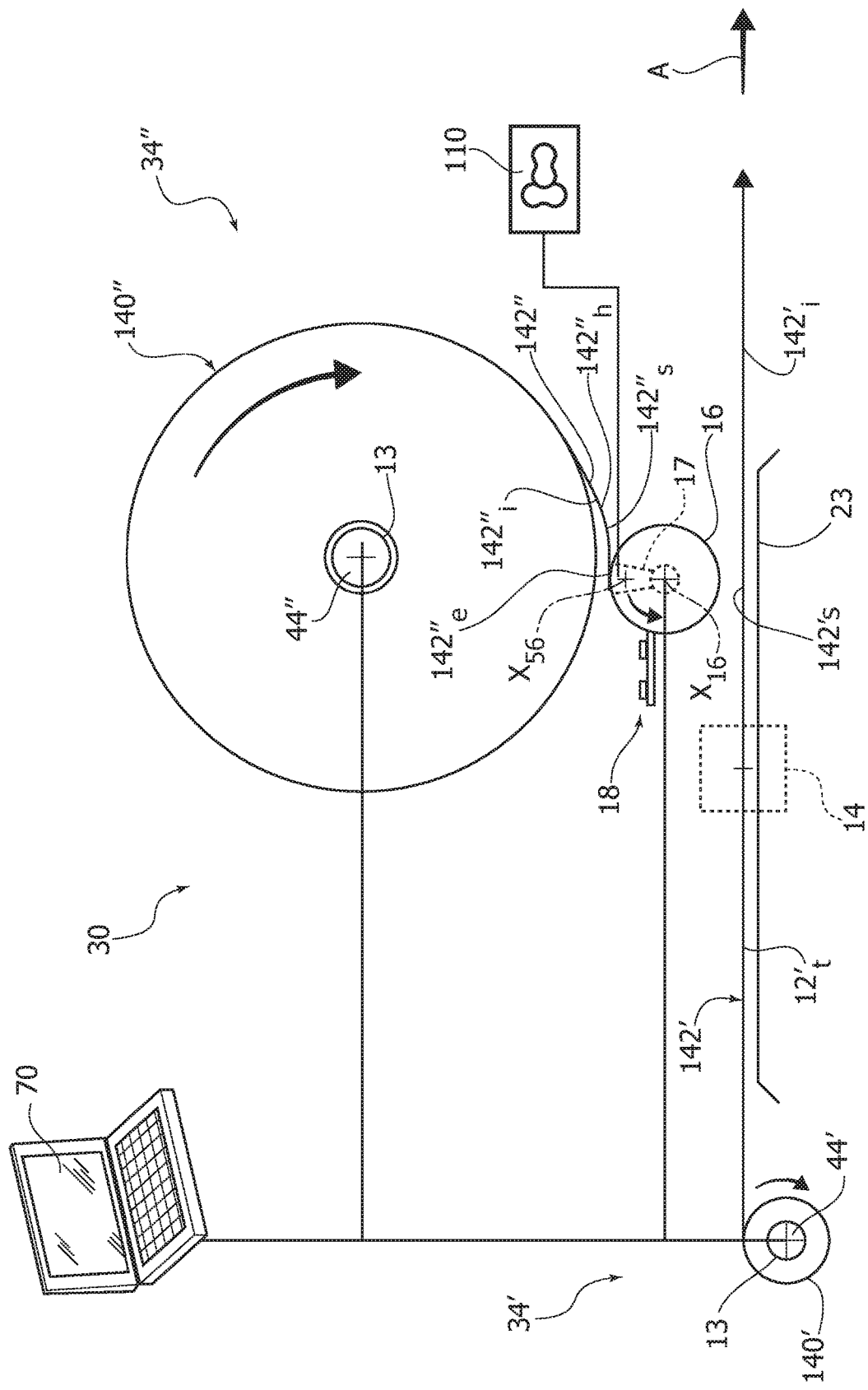
FIG. 14 is a schematic view illustrating the embodiment of FIG. 1 but with the reels unwinding in the opposite direction.

In the continuation of the document, but without removing generality from the discussion, the description of the apparatus 30 will be based on this type of unwinding with anticlockwise rotation of the reels but, as can be seen in the diagram of FIG. 14, the same apparatus 30 can be used in the case in which unwinding with a clockwise rotation of the reels is required, to have the inner surfaces 142'i and 142"i of the materials 142' and 142" facing downwards.

Figure 1:
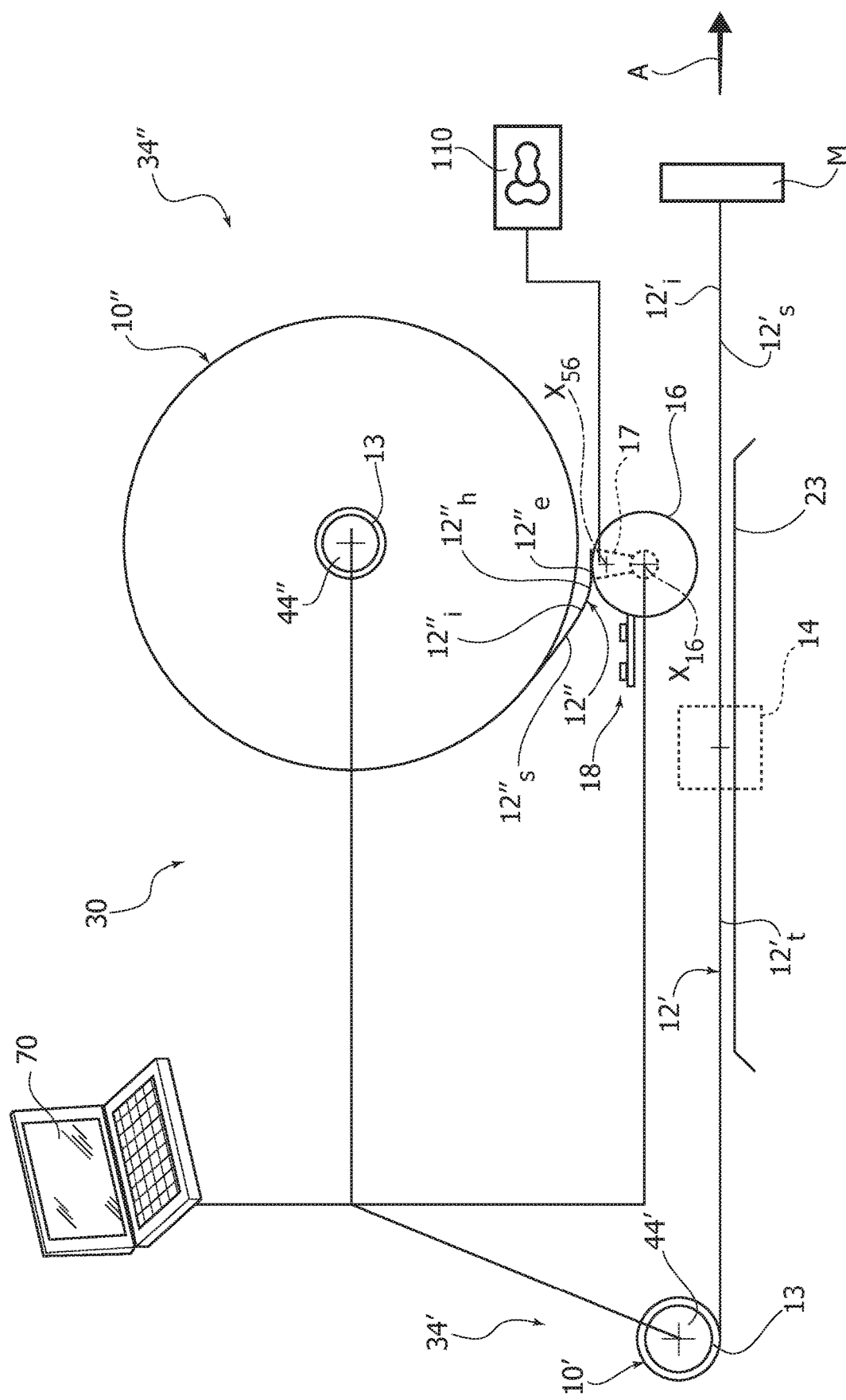
FIGS. 1, 2, 3, 4 and 5 are schematic views illustrating an embodiment of a method for automatically joining the tail portion of a first web of a reel about to finish with the head portion of a second web of a new reel in an unwinding assembly.

FIG. 1 illustrates a condition in which the first web 12' that unwinds from the first reel 10' advances along a feed direction A, while the second reel 10" is stationary and the steps for preparing the head end 12"h of the web 12" are beginning.

In one or more embodiments, a section of the first web 12' that unwinds from the first reel 10' runs along a feed direction A, which is typically straight and horizontal. In one or more embodiments, the first web 12' that unwinds from the first reel 10' passes through a stationary junction zone 14 during advancement in the direction A. In one or more embodiments the first reel 10' is located upstream of the junction zone 14. In one or more embodiments, the junction zone 14 is located along a straight section of the path of the first web 12' along the feed direction A.

While the first reel 10' is being unwound and feeds a production machine M in the feed direction A with the first web 12', the second reel 10" is in a waiting position, ready to replace the first 10' reel when the first 12' web is finished. In one or more embodiments, the second reel 10" in the waiting position is located downstream from the first reel 10'. In one or more embodiments, the second reel 10" in the waiting position is located downstream of the first reel 10' with reference to the feed direction A. In one or more embodiments, the second reel 10" in the waiting position is located above the straight section of the first web 12' that advances in the feed direction A. In one or more embodiments, the second reel 10" in the waiting position may be located downstream of the junction zone 14 with reference to the feed direction A. In one or more embodiments, the second web 12" of the second reel 10" is contained between two vertical planes passing through the opposite longitudinal edges of the first web 12' when it passes through the junction zone 14, so that, in a plan view of the junction zone 14, the first web 12' and the second web 12" typically overlap with each other.

In an initial configuration, the first reel 10' typically has dimensions substantially identical to those of the second reel 10". During operation, the outer diameter of the first reel 10' progressively decreases as the first web 12' is unwound from the first reel 10' and is fed in the feed direction A to the production machine M.

FIGS. 1-5 illustrate the condition in which the first reel 10' in the process of finishing must be replaced by the new reel 10". The state of finishing of the first reel 10' can be detected, for example, by measuring the length of the web 12' that has been fed starting from a new reel with a known length of the web wound onto the new reels. Instead of measuring the length of the unwound web, the state of finishing of the first web 10' can be detected by the information supplied by an encoder 49', which may be arranged on the unwinding shaft 44' on which the first reel 10' is mounted or, as will be better seen below, fitted directly on the motor 47' that actuates its rotation, since the encoder 49', wherever it is mounted, indirectly provides a measurement of the outer diameter of the reel 10', since the peripheral speed of the reel is proportional to the number of revolutions of the unwinding shaft 44' (peripheral speed of the reel v expressed in m/s results from the equation $v=n\times0.105\times R$ where n are the revolutions per minute and R is the radius of the reel in meters). As a further alternative, the state of finishing of the first web 10' can be detected by means of vision systems that detect the diameter of the reel 10' during unwinding. In general, the methods and devices used to determine the state of finishing of the reel 10' being unwound are known in the art and do not require a detailed description.

Figure 2:
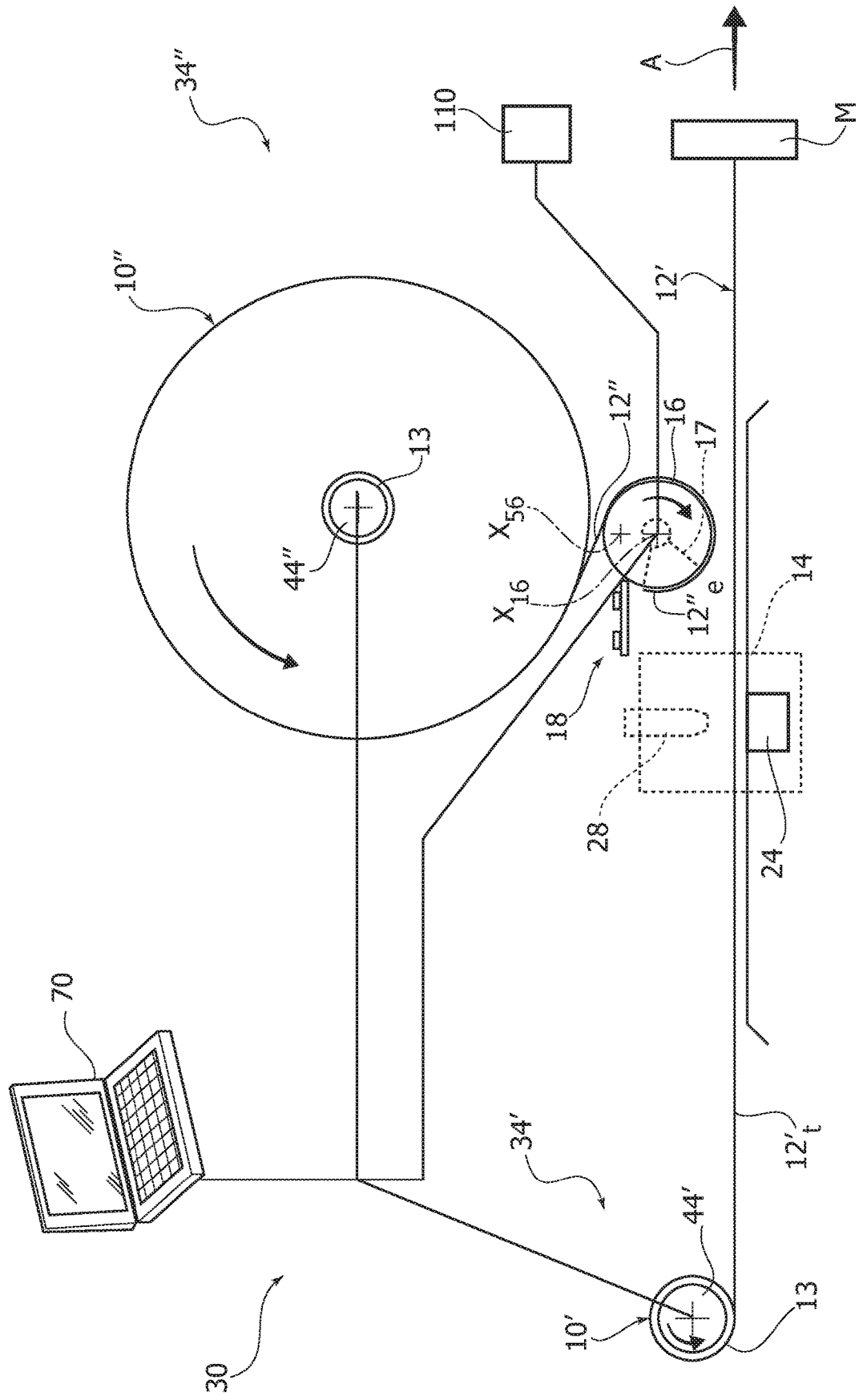
Figure 3:
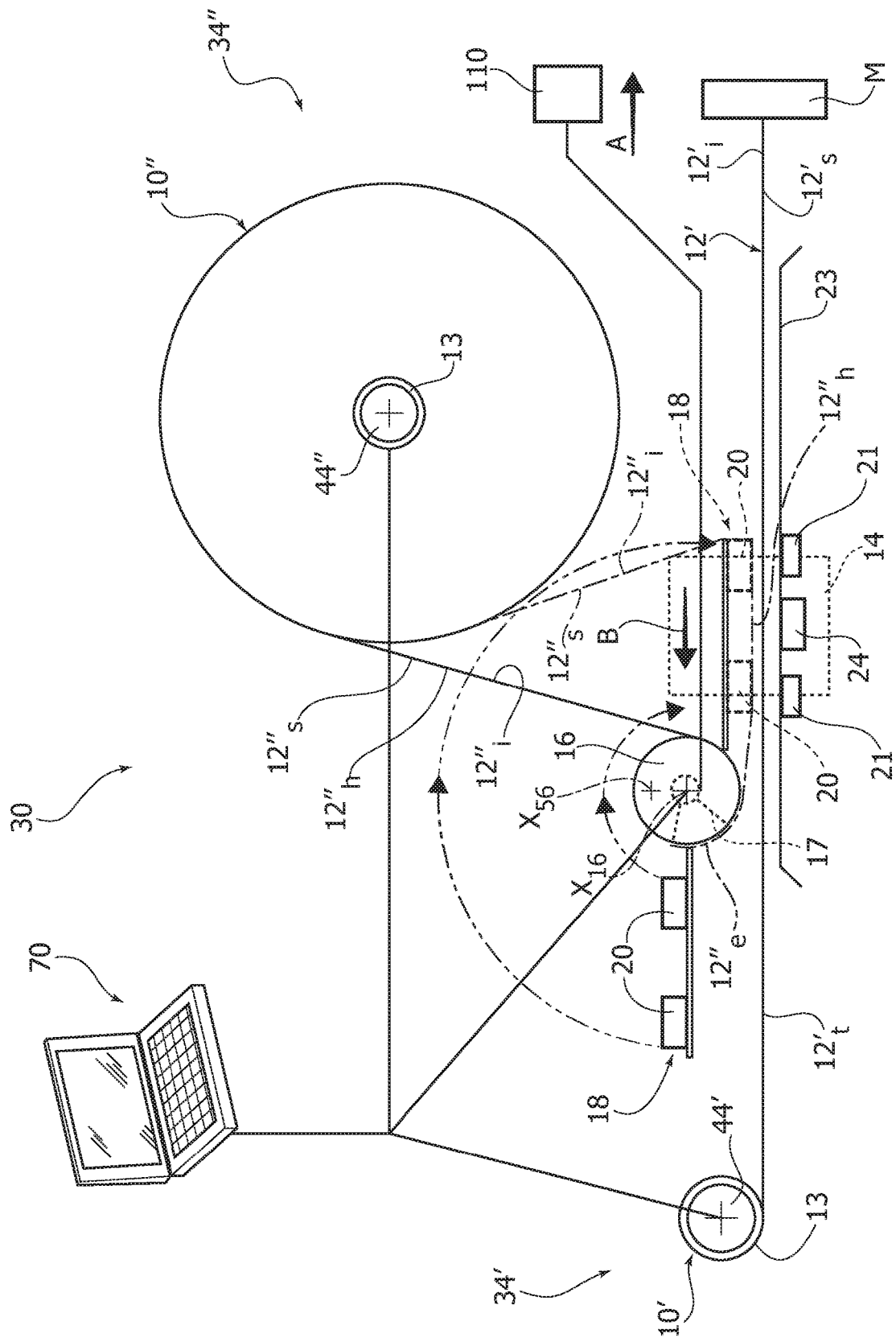
Figure 4:
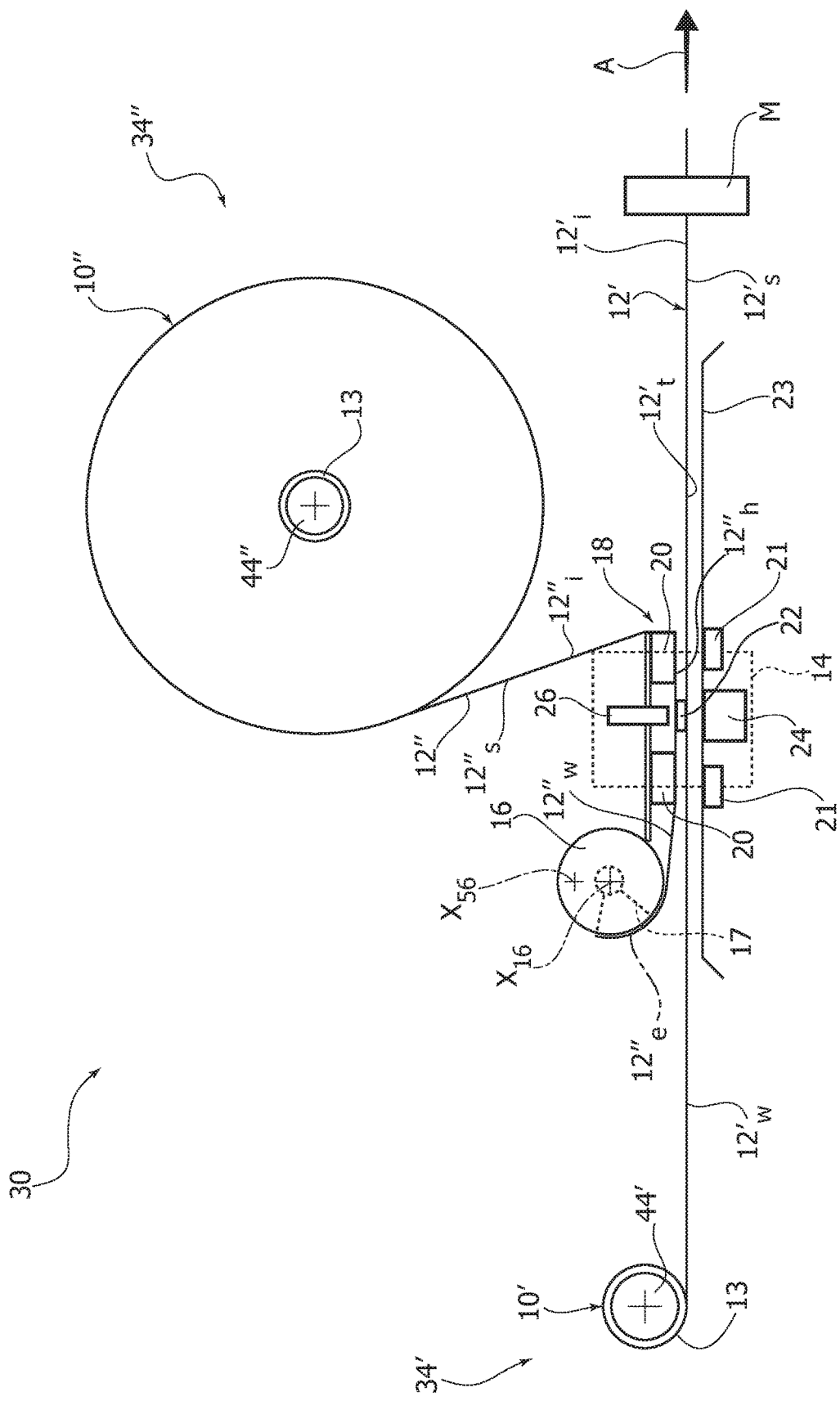
Figure 5:
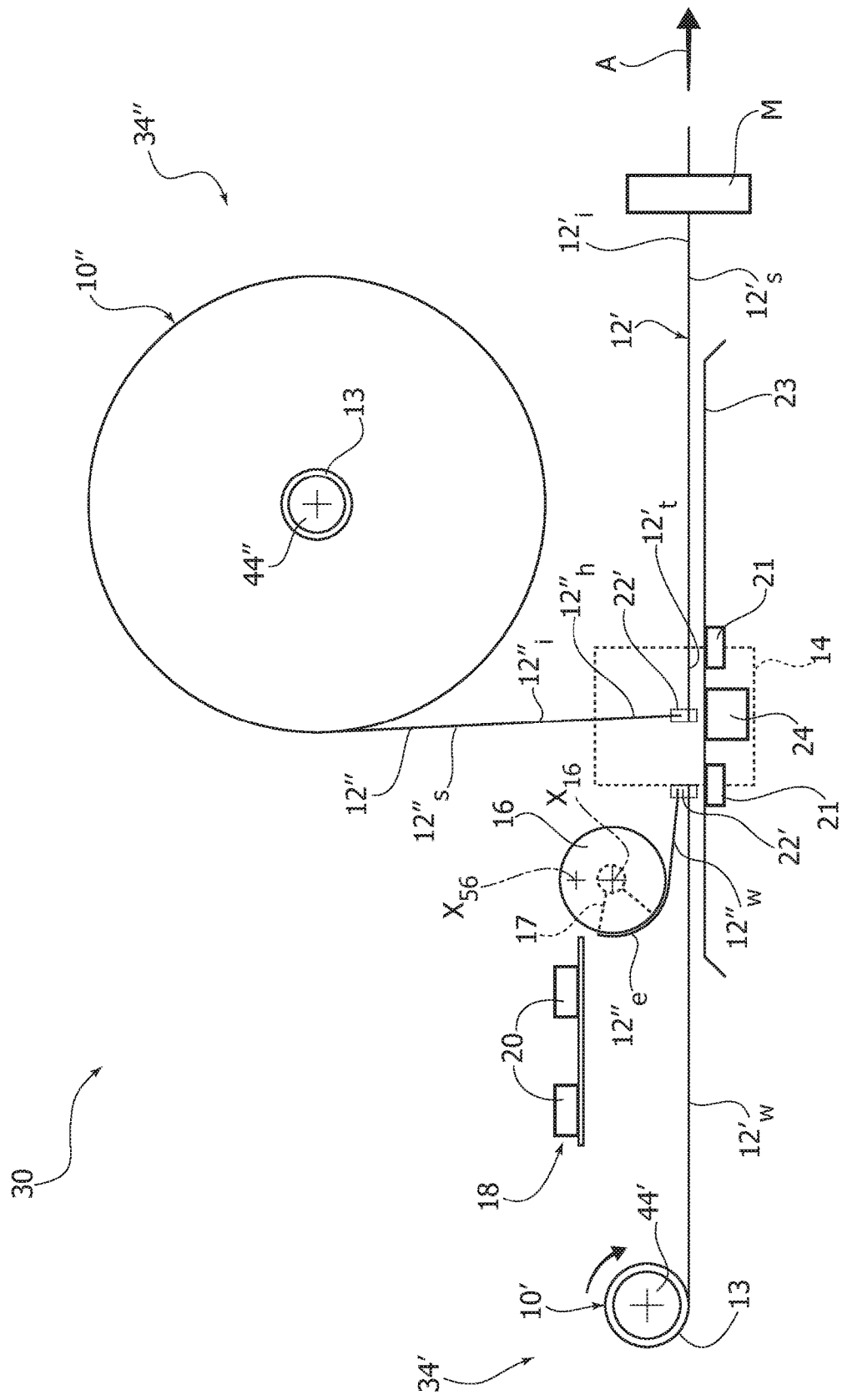
Figure 4A:
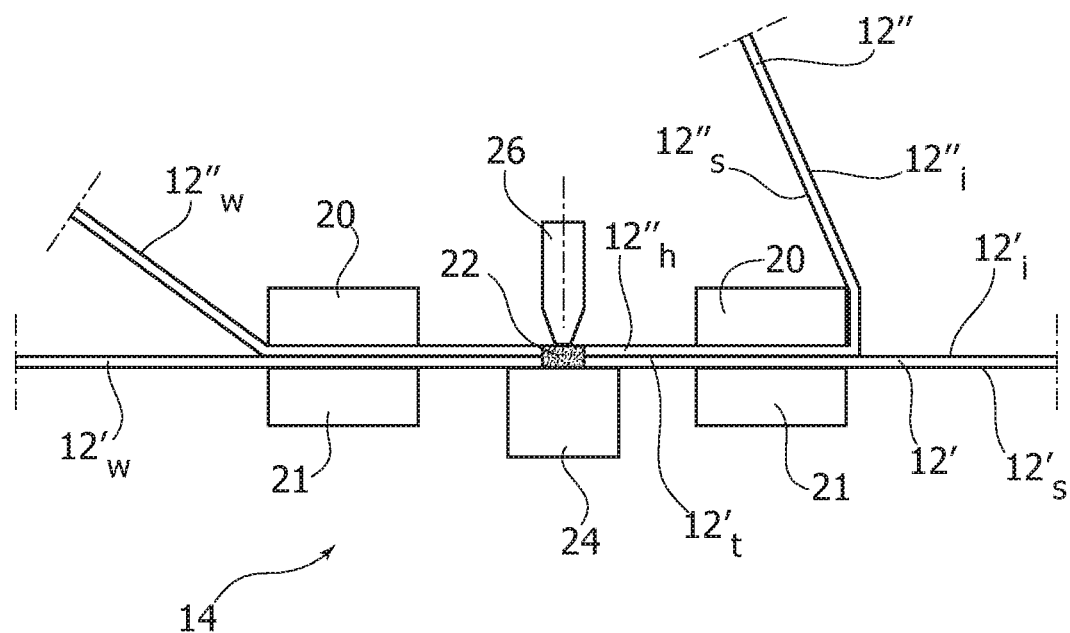
FIG. 4*a* is a detail of the junction between the tail portion of a first web of a reel about to finish with the head portion of a second web of a new reel in an unwinding assembly.
Figure 5A:
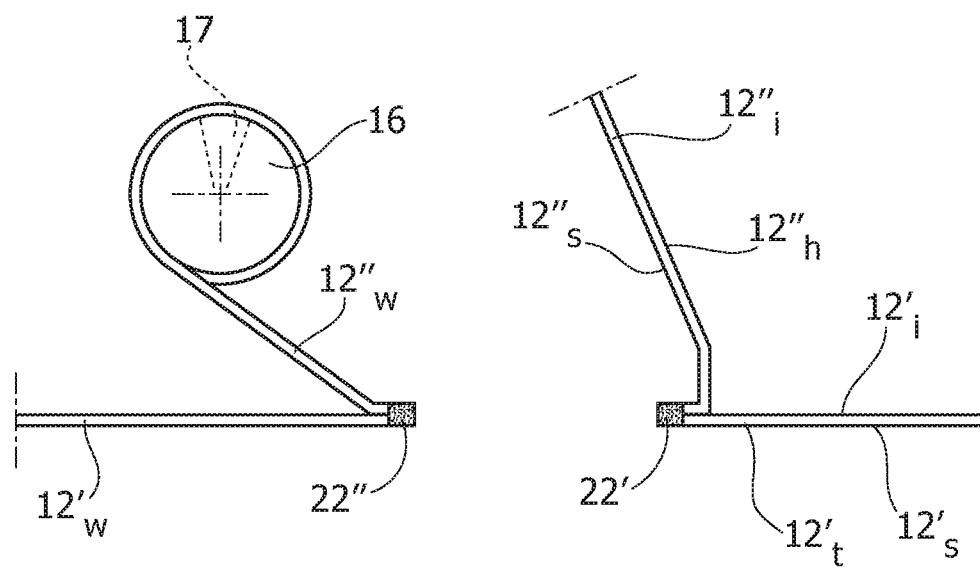
FIG. 5*a* is a detail of the junction formed between the tail portion of a first web of a reel about to finish with the head portion of a second web of a new reel in an unwinding assembly.

While the first web 10' feeds the production machine M, with reference to FIGS. 1-4, the operations for preparing the head end 12"h of the second web 12" are carried out in order to be able to join it to the tail section 12't of the first web 12', as illustrated in FIGS. 4a, 5 and 5a.

With reference to FIG. 1, one end 12"e of the second web 12" is picked up on the outer surface of the second reel 10" by means of a gripping element 16. In one or more embodiments, the gripping element 16 can be a roller rotating about an axis X16 parallel to the rotation axes of the reels 10', 10" when they are in the unwinding phase.

In one or more embodiments, the gripping element 16 capable of gripping the end 12"e of the second web 12" may be a roller provided with a suction chamber 17 connected to a sub-atmospheric pressure source 110.

In one or more embodiments, the end 12"e of the second web 12" may have an adhesive strip of plastic material, used to hold the end 12"e adherent to the outer surface of the reel 10" during the transport and handling steps of the reel. In one or more embodiments, the strip of plastic material—already present on the reels—may be used to facilitate gripping by means of suction, by the gripping element 16, of porous materials such as nonwoven fabrics.

In one or more embodiments, the second reel 10" may be positioned with an angular orientation in such a way that the end 12"e of the second web 12" is in a predetermined position, exploiting the information of the encoder 49" arranged on the unwinding shaft 44" on which the second reel 10" is mounted.

In one or more embodiments, the gripping element 16, exploiting the encoder of its motor, may be brought into a position tangent to the outer surface of the second reel 10", with the suction chamber 17 in contact with the end 12"e of the second web 12". The arrangement of the end 12"e of the second web 12" in contact with the chamber 17 of the gripping element 16 may be performed under the control of an electronic unit 70 that knows the position of the end 12"e of the second web 12" and the position of the suction chamber 17 of the gripping element 16.

In one or more embodiments, the suction force with which the gripping element 16 grips the end 12"e may be greater than the adhesive force that retains the strip of adhesive material applied to the end 12"e adherent to the outer surface of the reel 10", so that the gripping element 16 is capable of detaching the end 12"e of the second web 12" from the outer surface of the second reel 10".

As shown in FIG. 2, after having carried out the gripping by means of suction of the end 12"e, the gripping element 16 can be rotated about its own axis so as to wind a section of the web 12" on the outer surface of the gripping element 16 by making one or more turns, so as to firmly retain the end 12"e.

After having carried out gripping of the end 12"e as indicated above, the gripping element 16 and the second reel 10" are moved away from each other, so as to unwind a head section 12"h of the second web 12" from the second reel 10", as illustrated in FIG. 3.

In one or more embodiments, the relative distancing between the second reel 10" and the gripping element 16 may be obtained by moving the gripping element 16 in a straight direction opposite to the feed direction A, as indicated by the arrow B in FIG. 3. In this way, the head section 12"h of the second web 12" extends along a straight path between the outer surface of the second reel 10" and the outer surface of the gripping element 16.

With reference to FIG. 3, the gripping element 16 is positioned upstream of the junction zone 14 with reference to the feed direction A, typically by means of a translation, so that at least one part of the head section 12"h of the web 12" is located upstream with respect to a vertical plane passing through the junction zone 14. In this position, a lower surface 12"i of the head section 12"h typically faces the feed direction A, while an upper surface 12"s of the same head section 12"h faces the opposite side of the feed direction A.

After having positioned the gripping element 16 upstream of the junction zone 14, a further preparation step is carried out, as illustrated in FIGS. 3 and 4, thanks to a positioning element 18 that is brought into contact with the upper surface 12"s of the head section 12"h of the second web 12". In this additional preparation step, the positioning element 18 is moved towards the junction zone 14. During the movement towards the junction zone 14, the positioning element 18 encounters the head section 12"h that extends between the gripping element 16 and the second reel 10", so that the positioning element 18 moves a portion of the head section 12"h towards the junction zone.

In one or more embodiments, the movement that moves the positioning element 18 towards the junction zone 14 may be a rotation movement about a transverse axis X56, which can be parallel or even coincident with the rotation axis X16 of the gripping element 16. The trajectory of the rotation movement of the positioning element 18 interferes with the head section 12"h that extends between the outer surface of the second reel 10" and the gripping element 16. The positioning element 18 may comprise two parallel transverse bars 20 parallel and spaced apart from each other, which engage a portion of the head section 12"h and superimpose it on a straight portion of the tail section 12't of the first web 12', holding—in the junction zone 14—the portion of the head section 12"h of the second web 12" and the portion of the tail section 12't of the first web 12' parallel and spaced apart from each other, without the two webs coming into contact with each other to allow the first web 12', in the meantime, to continue feeding the production machine M in the direction A, and with the lower surface 12"i of the second web 12" facing the upper surface 12's of the first web 12', as indicated in FIG. 4.

To create the junction between a portion of the head section 12"h of the second web 12" and a portion of the tail section 12't of the first web 12', the portions of the first web 12' and the second web 12" that extend through the junction zone 14 are brought into contact with each other by the two transverse bars 20 which press the first web 12' and the second web 12" against each other against the contrast surfaces 21 also present in the junction zone 14 which, as shown in FIG. 4a, may be an integral part of the junction zone 14, or can be an integral part of a sliding plane 23 on which the web 12', 12" flows in the feed direction A.

With reference to FIGS. 4 and 4a, in the overlapping step of a portion of the head section 12"h of the second web 12" with a portion of the tail section 12't of the first web 12', the homologous surfaces of the first web 12' and of the second web 12" are brought into contact with each other. In the embodiment illustrated in FIGS. 1 to 9, in which the unwinding direction of the reels is anticlockwise, the surfaces that are placed in contact with each other are the inner surfaces 12'i and 12"i. Likewise, in the embodiment shown in FIG. 14, in which the unwinding direction of the reels is clockwise, the surfaces that are placed in contact with each other are the outer surfaces 142's and 142"s.

With reference to FIG. 4a, after having overlapped a portion of the head section 12"h of the second web 12" with a portion of the tail section 12't of the first web 12', as previously described, a junction is made between the head section 12"h of the second web 12" and the tail section 12't of the first web 12" in the junction zone 14, forming a transverse junction band 22.

This welding can be carried out by any welding device normally used for the transverse welding of webs in machines for producing absorbent sanitary products.

In one or more embodiments, the junction between the head section 12"h of the second web 12" and the tail section 12't of the first web 12" can be made by welding. In one or more embodiments, the welding can be a thermal welding, an ultrasonic welding or a cold mechanical welding (or crimping).

As illustrated schematically in FIG. 4b, the transverse welding 22 between the head section 12"h of the second web 12" and the tail section 12't of the first web 12" can be carried out by compressing the head section 12" and the tail section 12't between an anvil 24 and a welding element 26. The anvil 24 and the welding element 26 can be displaced between a rest position and an operative position. For example, the anvil 24 and the welding element 26 can be displaced in a transverse direction between a rest position and an operative position. It is also possible to move either the anvil 24 or the welding element 26, leaving the element placed under the webs fixed in position. In the embodiment illustrated in FIGS. 6 to 9, the welding element 26, which may be a welding wheel, moves in a transverse direction with respect to the anvil 24, which remains fixed.

The welding element 26 may act between the two bars 20 of the positioning element 18. The transverse welding between the head section 12"h of the second web 12" and the tail section 12't of the first web 12" is particularly easy to perform because the two web portions are stationary and overlapped on each other in a typically flat position.

In one or more embodiments, the junction between the head section 12"h of the second web 12" and the tail section 12't of the first web 12" can be made by gluing. In this case, a step of supplying a transverse strip of glue on a portion of the tail section 12't of the first web 12' located in the junction zone 14 before overlapping with the head section 12"h of the second web 12" can be provided. Dispensing the transverse strip of glue may, for example, be carried out by means of a dispensing nozzle indicated by 28 in FIG. 2, movable in the junction zone 14 in a direction transverse to the first web 12'. Alternatively, instead of dispensing a strip of glue, application of a double-sided adhesive strip may be provided on a portion of the tail section 12't of the first web 12' located in the junction zone 14 before overlapping with the head section 12"h of the second web 12". Application of the double-sided adhesive strip can be carried out with devices and methods known in the art.

The junction by means gluing can be obtained by compressing the portions of the two webs 12', 12" overlapped on each other, with the glue layer or double-sided adhesive strip interposed between the facing surfaces of the two webs 12', 12".

As illustrated in FIGS. 4 and 4a, when the control system 70 detects the state of finishing the first reel 10' so that it is necessary to carry out its replacement, the first unwinding and handling unit 34' stops the rotation of the respective shaft 44', blocking the flow of the first web 12' in the feed direction A.

In these conditions, with the first web 12' and the second web 12" in stationary conditions, it is possible to identify:

a first waste portion 12'w of the first web 12' that extends from the periphery of the first reel 10' up to the junction zone 14 close to where the junction 22 will be made between the first and the second webs 12' and 12" at the anvil 24 and the welding element 26;

a portion of the tail section 12't of the first web 12' that extends in a straight direction from the junction zone 14 close to where the junction 22 will be made at the anvil 24 and the welding element 26 and continues towards the production machine M;

a second waste portion 12"w of the second web 12" extending from the junction zone 14 close to where the junction 22 will be made at the anvil 24 and the welding element 26 up to the gripping element 16; and a portion of the head section 12"h of the first web 12" that extends from the junction zone 14 close to where the junction 22 will be made at the anvil 24 and the welding element 26 up to the periphery of the second reel 10".

After having formed the transverse junction band 22, the positioning device 18 is brought into the initial rest position.

With reference to FIG. 5a, the joining method also involves a cutting step in the transverse direction of the head section 12"h and of the tail section 12't to separate the respective waste portions 12'w and 12"w from the first and second webs 12', 12", located upstream of the junction 22.

The cutting operation may take place simultaneously with the welding operation, according to techniques well known in the sector. In the case of joining by means of gluing, the cut may take place during the compression of the two web portions 12', 12", for example, by providing a transverse knife between the compression elements. In this case too, these are techniques well known in the sector.

In one or more embodiments, the transverse cut can be carried out on the junction band 22, so as to divide the junction band 22 into a front junction zone 22' and into a rear junction zone 22". As illustrated in FIG. 5 and, in greater detail, in FIG. 5a, the front junction zone 22' joins together a rear edge 12't of the first web 12' and a front edge 12"h of the second web 12". The rear junction zone 22" joins together the waste portion 12'w carried by the first reel 10' and the waste portion 12"w carried by the gripping element 16. The two waste portions 12'w and 12"w can be collected on the first reel 10' by rotating the first reel 10' about its axis, i.e. by rotating the shaft 44' of the first unwinding and handling unit 34' in the opposite direction to the unwinding direction, freeing the gripping element 16, which is thus ready to repeat a new cycle.

The unwinding shaft 44' of the unwinding and handling unit 34' carrying the finished reel 10' containing the waste portions 12'w and 12"w may be moved to carry the finished reel 10' into a waste collecting container 53.

After execution of the junction operation, the unwinding shaft 44" of the unwinding and handling unit 34" carrying the second reel 10" is moved to the position previously occupied by the unwinding shaft 44' of the unwinding and handling unit 34', and the second web 12" can be fed in the feed direction A. Then, the first unwinding and handling unit 34' picks up a new reel from the pile 33' of waiting reels by inserting its unwinding shaft 44' into the cylindrical opening 54 of the reel core 13 which, in this way, becomes the new first reel 10' and places it in a waiting position, ready to replace the second reel 10" when it is finished, in a completely similar manner as described above.

The gripping element 16 and the positioning element 18 can be moved in a transverse direction into a rest position after completion of the joining operations, so as not to obstruct the path of the second web 12" during the movement of the second web 10" from the waiting position to the unwinding position.

Figure 6:
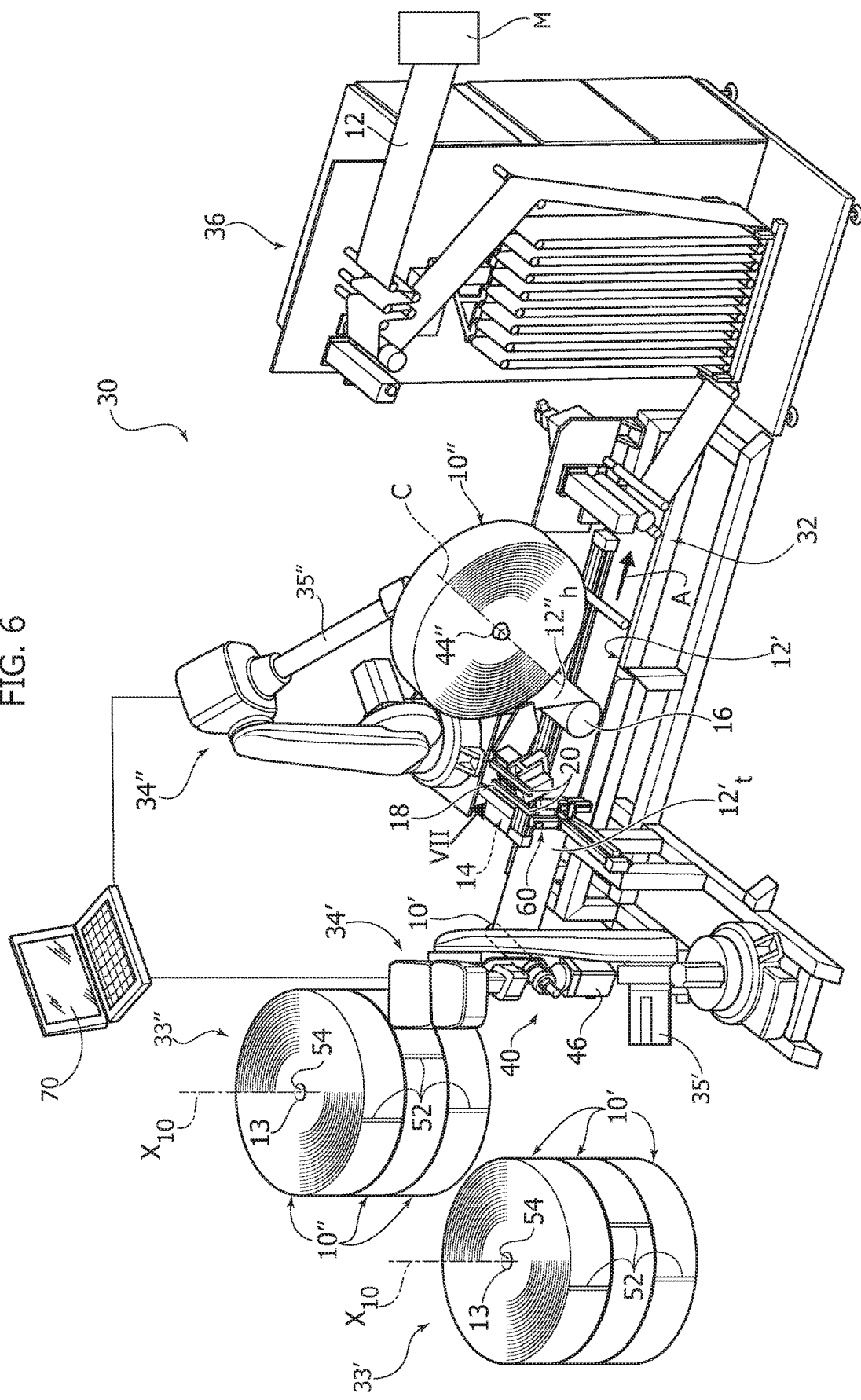
FIG. 6 is a perspective view illustrating an embodiment of an unwinding assembly.

With reference to FIG. 6, the reference numeral 30 designates—as a whole—an unwinding assembly, configured for implementing the previously described joining method.

The elements corresponding to those previously described are indicated with the same numerical references.

The unwinding assembly 30 comprises a stationary base frame 32, a sliding plane 23 on which a feed path is defined, along which a web coming from an unwinding reel is movable in the feed direction, specifically the first web 12' that unwinds from the first reel 10'.

In one or more embodiments, the unwinding assembly 30 comprises a first and a second unwinding and handling unit 34', 34", which can be controlled by respective control units or by a centralized control unit 70. The unwinding and handling units 34', 34" are controlled to pick up respective reels 10', 10" from piles 33', 33" of waiting reels located in one or more storage areas and to move the respective reels 10', 10" during the unwinding and joining operations.

In one or more embodiments, in an unwinding assembly 30, the storage area of the new reels 10', 10" can typically comprise two piles 33', 33" of reels and each unwinding and handling unit 34' and 34" is typically sized to be able to pick up the reels from both piles 33' and 33".

This choice makes it easier to handle and move the reels, since it gives more time to the operators and/or wire-guided trolleys to supply the various unwinding assemblies 30 present along the production machine M with piles 33 of new reels 10, without running the risk of having to stop the production machine M due to the lack of raw material.

At the outlet of the unwinding assembly 30, an accumulator or buffer 36 can be arranged, which allows storage of a certain length of the webs 12' or 12" to allow feeding the webs 12' or 12" to the production machine located downstream without discontinuity during the reel-change operations, which require a temporary stop of the feeding of the webs 12' or 12". One example of an accumulator or buffer 36 that can be advantageously used at the outlet of the unwinding assembly 30 is described in EP 1 013 585 A1 "Device for supplying web material" owned by the Applicant.

Figure 15:
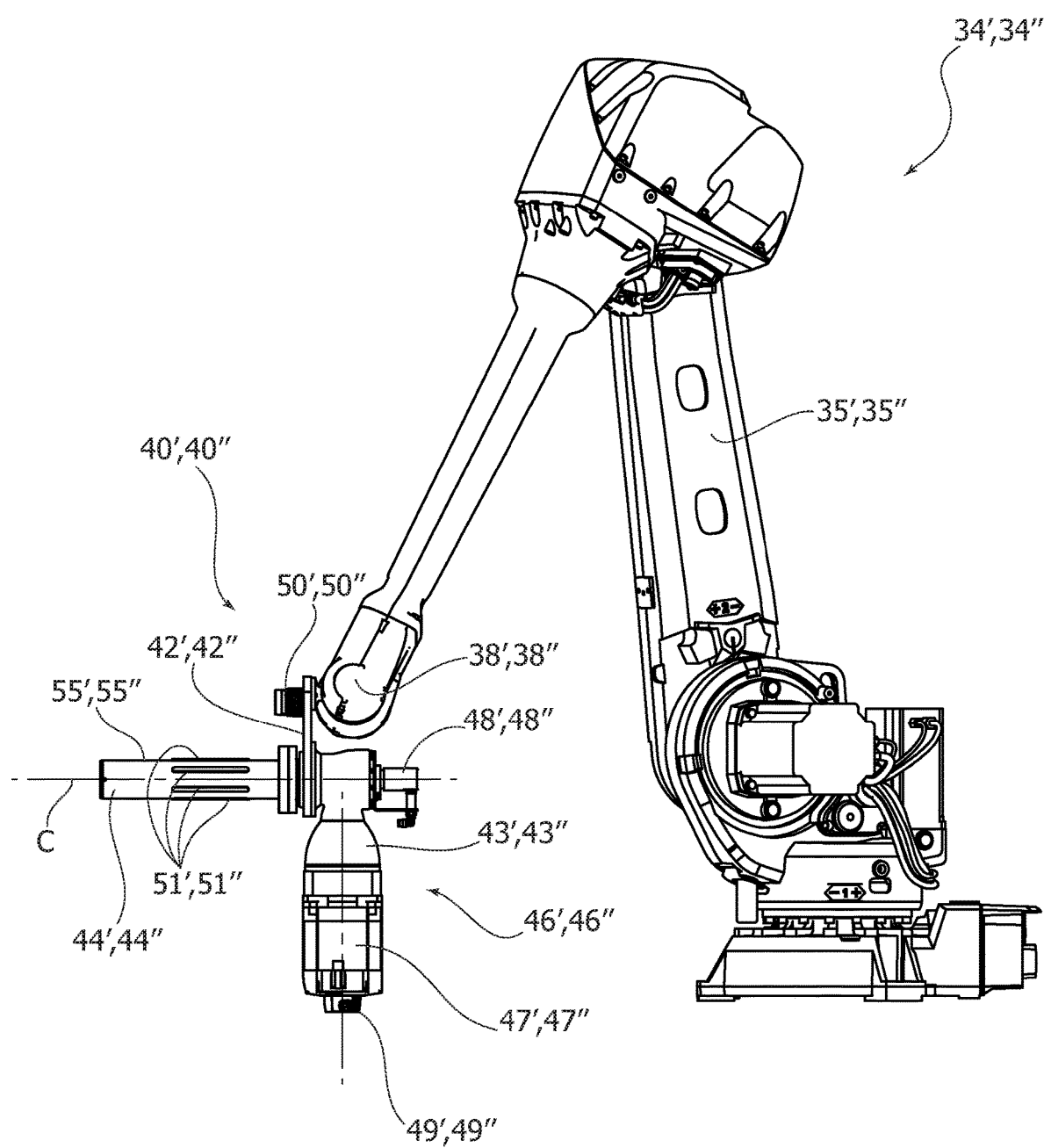
FIG. 15 is a perspective view illustrating an embodiment of an unwinding and handling unit.

In one or more embodiments, with reference to FIG. 15, each unwinding and handling unit 34', 34" can be composed of a respective anthropomorphic robot 35', 35". In one of the embodiments, a robot 35 suitable for use in the unwinder 30 can be a 6-axis anthropomorphic robot for medium loads, model TX90, produced and marketed by Staubli International AG—PO Box 30—CH-8808 Pfäffikon/Switzerland. However, it is possible to carry out the same operations by installing the unwinding device 40 on modular linear systems, such as Linearmodule MKK linear systems, or the like, equipped with recirculating ball screw drives produced and marketed by Bosch Rexroth SpA Linear Motion and Assembly Technologies—via G. Di Vittorio, 1-20063 Cernusco Sul Naviglio (MI) Italy.

In each robot 35', 35", the relative wrist 38', 38" carries a respective unwinding device 40', 40". Each unwinding device 40', 40" comprises a support 42', 42" fixed to the wrist 38', 38" of the respective robot 35', 35". In one or more embodiments the support 42', 42" can be a flange.

Each support 42', 42" carries a respective unwinding shaft 44', 44" rotatable about its own axis C. Each unwinding device 40', 40" typically comprises motor means configured to rotate the respective shaft 44', 44". In one or more embodiments, these motor means may comprise a respective gearmotor assembly 46', 46". In one or more embodiments, each gearmotor assembly 46', 46" may comprise a respective motor 47', 47" directly fitted to a corresponding gearbox 43'43".

Each of the unwinding devices 40', 40" may comprise a respective encoder 49', 49" that detects the angular position and the speed of the corresponding unwinding shaft 44', 44". In one or more embodiments the encoders 49' and 49" can be integrated in the motors 47' and 47".

A motor suitable to be used for this particular application is the servomotor produced and marketed by Siemens with the code 1FK 16.6 Nm 3,000RPM 400V SINGLE. In conjunction with the Siemens motor, the gearbox produced and marketed by Wittenstein alpha GmbH with the identification code TK+025B-MF1-3-6K1-1K00 with hollow shaft can be used advantageously.

Each unwinding and handling unit 34', 34" can comprise a respective vision device 50', 50", such as, for example a camera, also carried by the corresponding support 42', 42" and arranged to acquire usable images from the control unit 70 of the respective robot 35', 35".

In one or more embodiments, the vision device 50', 50" of each unwinding and handling unit 34', 34" can be used to drive the movement of the respective unwinding device 40', 40".

Figure 11:
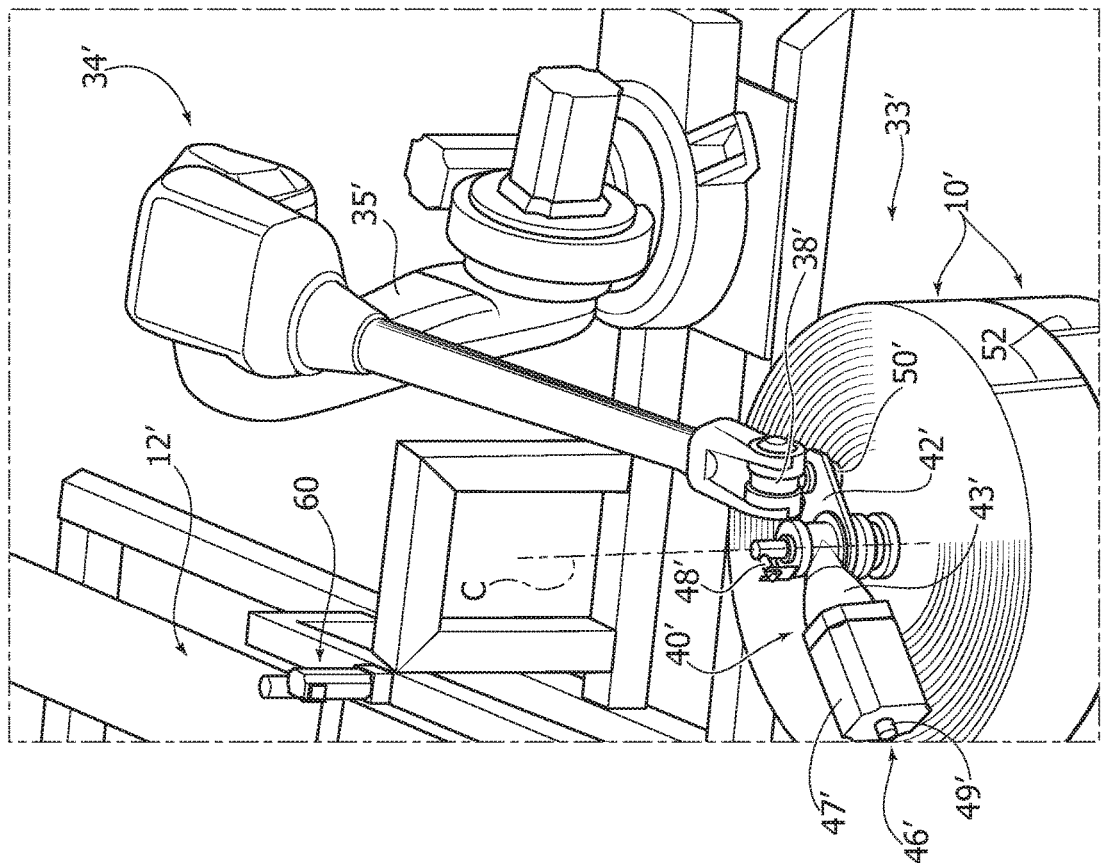
Figure 10:
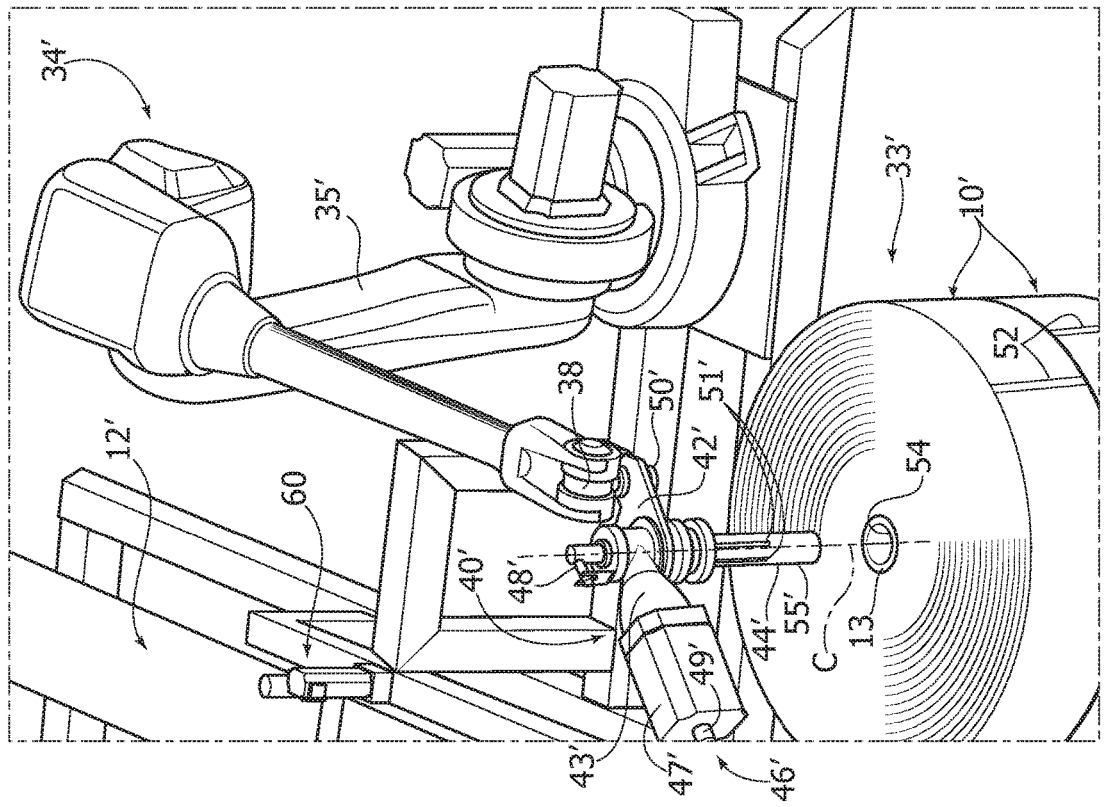

FIGS. 10 and 11 illustrate the methods of picking up the reels 10', 10" by the unwinding and handling units 34', 34". FIGS. 10 and 11 illustrate the taking of a reel from the first pile 33' by the first unwinding and handling unit 34' which, therefore, will be called the first reel and, consequently, the numeral 10'. It is understood that what is said in relation to the first unwinding and handling unit 34' is identical for the second unwinding and handling unit 34" and, in particular, the reels picked up from the second unwinding and handling unit 34" will be identified as second reels and they will take the numeral 10".

In one or more embodiments, the vision device 50' of the first unwinding and handling unit 34' can be used to acquire information on the angular position of the adhesive strip 52 that retains the end of the web 12' adherent to the surface of the reel 10'. Information on the angular position of the strip of plastic material 52 can be used to arrange the reel 10' picked up, respectively, by the first unwinding and handling unit 34' from the first pile 33' of waiting reels 10', in a predetermined angular position for the grip of the strip 52 by the gripping element 16.

In one or more embodiments, the vision device 50' of the first unwinding and handling unit 34' can be used to detect the diameter of the reel 10' that it will pick up when the reel 10' is still on the first pile 33' of waiting reels. In one or more embodiments, the vision device 50' of the first unwinding and handling unit 34' can be used to detect the position of the central opening 54 of the reels 10' when they are still stacked in the pile 33' of waiting reels.

A suitable vision device for these purposes may be the C3-2350-CL type camera produced and marketed by the Automation Technology GmbH Hermann Boessow Strasse, 6-8 23843 Bad Oldesloe Germany, which is typically used in combination with laser line illuminators of the Flexpoint MV type, manufactured and marketed by Laser Components GmbH Werner Von Siemens Strasse 15 82140 Olching Germany.

In one or more embodiments, the picking up of the reels 10' or 10" by the unwinding and handling units 34' or 34" is performed by inserting the respective unwinding shaft 44', 44" within the central hole 54 of a reel 10' or 10" waiting in the respective pile 33', 33". The images acquired by the respective vision device 50', 50" can be used by the control unit 70 of the unwinding and handling units 34' or 34" to guide the insertion of the respective unwinding shaft 44 inside the hole 54 of the respective reel 10' or 10". FIG. 11 illustrates the condition in which the unwinding shaft 44' of the first unwinding and handling unit 34' is inserted within the central hole 54 of a reel 10'.

After having inserted, for example, the unwinding shaft 44' into the central hole 54 of the reel 10', from now on called the first reel 10', the reel 10' is gripped by the unwinding shaft 44' by pushing outwards the expansion elements 51' that project from the outer surface 55' of the unwinding shaft 44', by means of pressurized air which, in the embodiment illustrated in FIGS. 10 and 11, is sent to the unwinding shaft 44' through a rotary joint 48' that allows the expansion elements 51' to maintain contact with the source of pressurized air during all the unwinding steps of the reel.

The unwinding and handling units 34', 34" are capable of picking up reels 10' or 10" from piles of reels 33', 33" arranged in the storage area with any orientation of their axis X10.

Before picking up a reel 10', 10", the unwinding and handling unit 34' or 34" can move the respective vision device 50', 50" about the outer surface of the reel to detect the position of the strip of adhesive tape 52, so that in the successive step, after having picked up the reel, the control unit 70 of the unwinding and handling unit 34', 34" knows the angular position of the strip 52 and is able to place the reel 10' or 10" in the waiting position with the strip 52 placed in an area so that it can be easily captured by the gripping element 16 by means of suction.

The unwinding and handling units 34', 34" hold the respective reels 10', 10" on the respective unwinding axes 44', 44" during unwinding of the respective reels 10', 10" and during the preparation and reel-change operations.

After a reel-change operation, the unwinding and handling unit 34' or 34" unloads the central core 13 of the finished reel 10', 10" into a waste collection container 53 that may be a single one for both unwinding and handling units 34', 34". Alternatively, there may be several waste collecting containers 53, each one dedicated to a respective unwinding and handling unit 34', 34".

Figure 16:
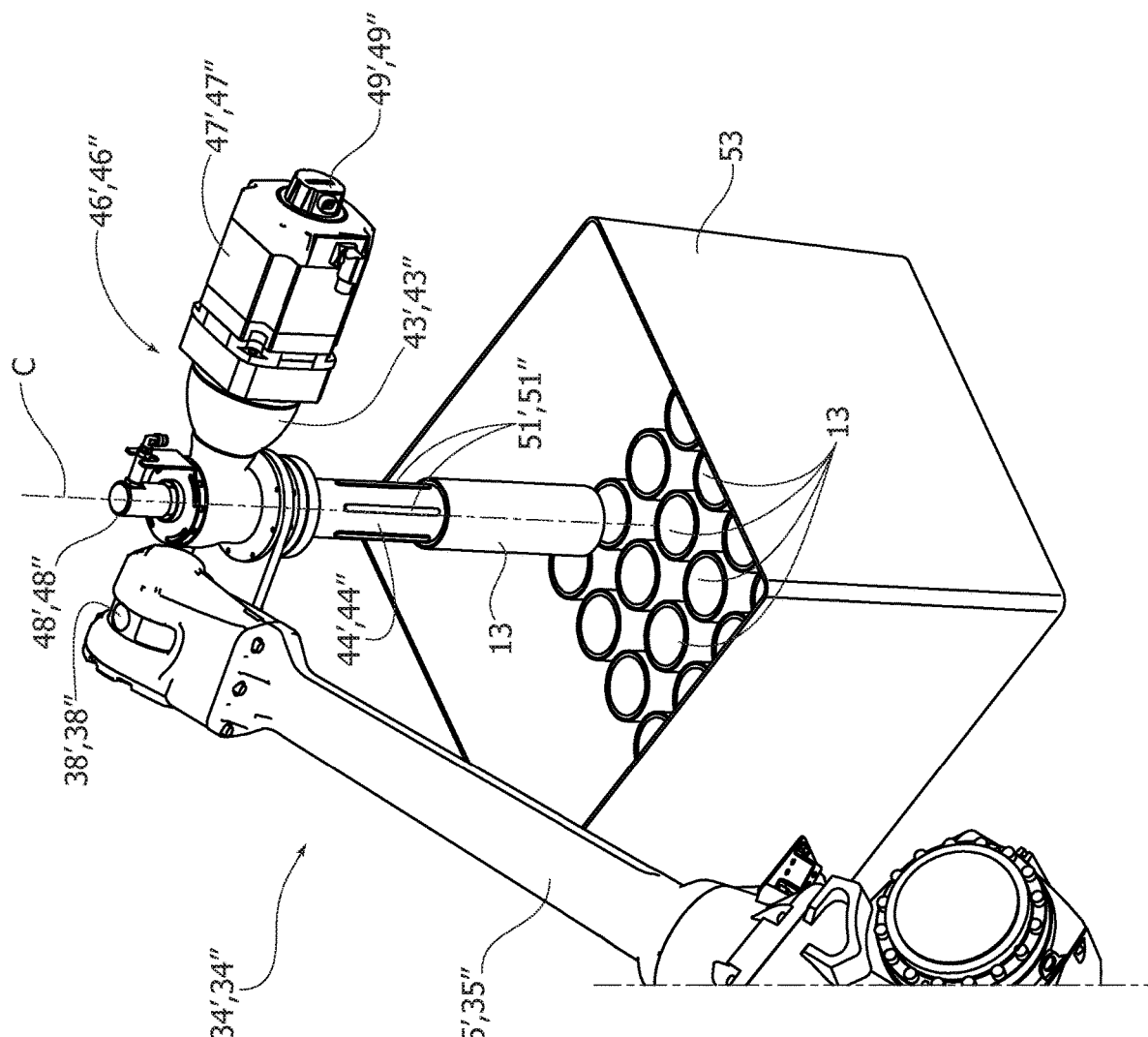
FIG. 16 is a perspective view illustrating an automatic unloading step of the central core of a finished reel.

In one or more embodiments, as illustrated in FIG. 16, it is possible to unload the central core 13 of the finished reel 10', 10" by rotating the unwinding device 40', 40", for example by suitably moving the relative wrist 38', 38" of the corresponding robot 35', 35" of the unwinding and handling unit 34', 34", bringing the axis C of the shaft 44', 44" into an almost vertical position with the shaft 44', 44" facing downwards, in this way, after having retracted the expansion elements 51', 51" towards the inside of the outer surface 55', 55" of the unwinding shaft 44', 44", discharging the pressurized air, due to gravity, the central core 13 of the finished reel 10', 10" slides inside the waste collecting container 53. In one or more embodiments it is possible to unload the central core 13 of the finished reel 10' or 10", maintaining the axis C of the shaft 44', 44" of the unwinding device 40', 40" of the robot 35 of the unwinding and handling unit 34' or 34" in an almost horizontal position, but integrating the waste collection system with a gripping device of the central core 13, for example a pneumatic gripper, which keeps the central core 13 of the finished reel 10', 10" stationary, allowing the shaft 44', 44" to slip off after it has retracted the expansion elements 51', 51" towards the inside of its outer surface 55', 55", discharging the pressurized air. The central core 13 of the finished reel 10' or 10", after being freed from the shaft 44', 44", is released by the pneumatic gripper, which drops it inside the waste collecting container 53. In one or more embodiments, it is possible to integrate the gripping device as an aid to the force of gravity, i.e. also in the case in which unloading of the central core 13 of the finished reel 10' or 10" is carried out by rotating the axis C of the shaft 44', 44" into a nearly vertical position. A nearly vertical or horizontal position of the axis C means a position in which the aforesaid axis C of the shaft 44', 44" forms an angle between 0 and 45° with the respective vertical or horizontal axis.

The unwinding and handling unit 34' or 34", after having released the respective shaft 44', 44" from the core 13 of the finished reel 10', 10", picks up a new reel 10 from the respective pile 33', 33" and carries it into the waiting position ready to perform the reel-change operation when the reel carried by the other unwinding and handling unit is finished. The two unwinding and handling units 34', 34" can be located on opposite sides with respect to a vertical plane passing through the center line of the web in the process of being unwound.

Figure 7:
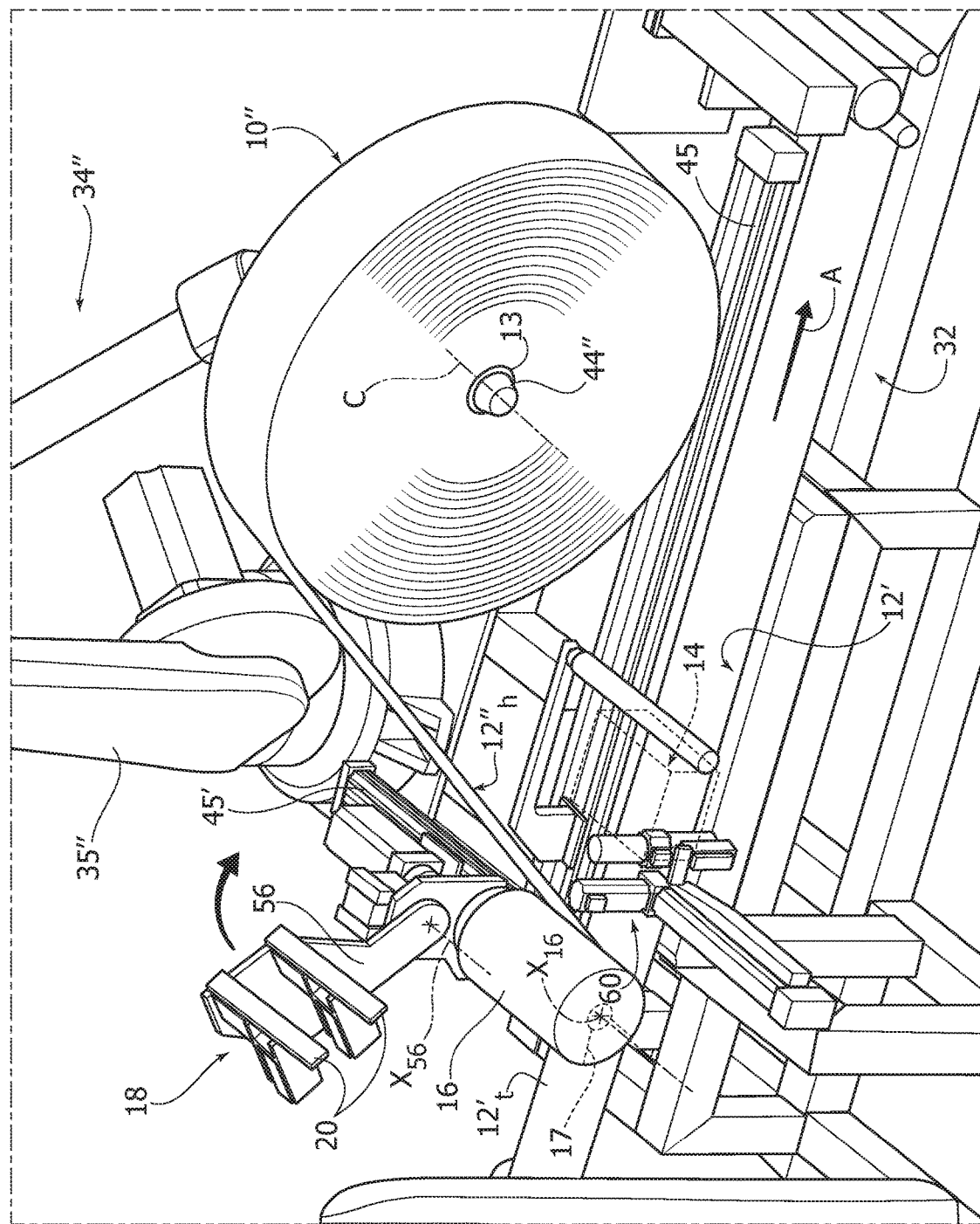
FIGS. 7, 8 and 9 are perspective views on an enlarged scale illustrating the operation of the part indicated by the arrow VII in FIG. 6, FIGS. 10 and 11 are perspective views illustrating an automatic gripping step of a reel.
Figure 8:
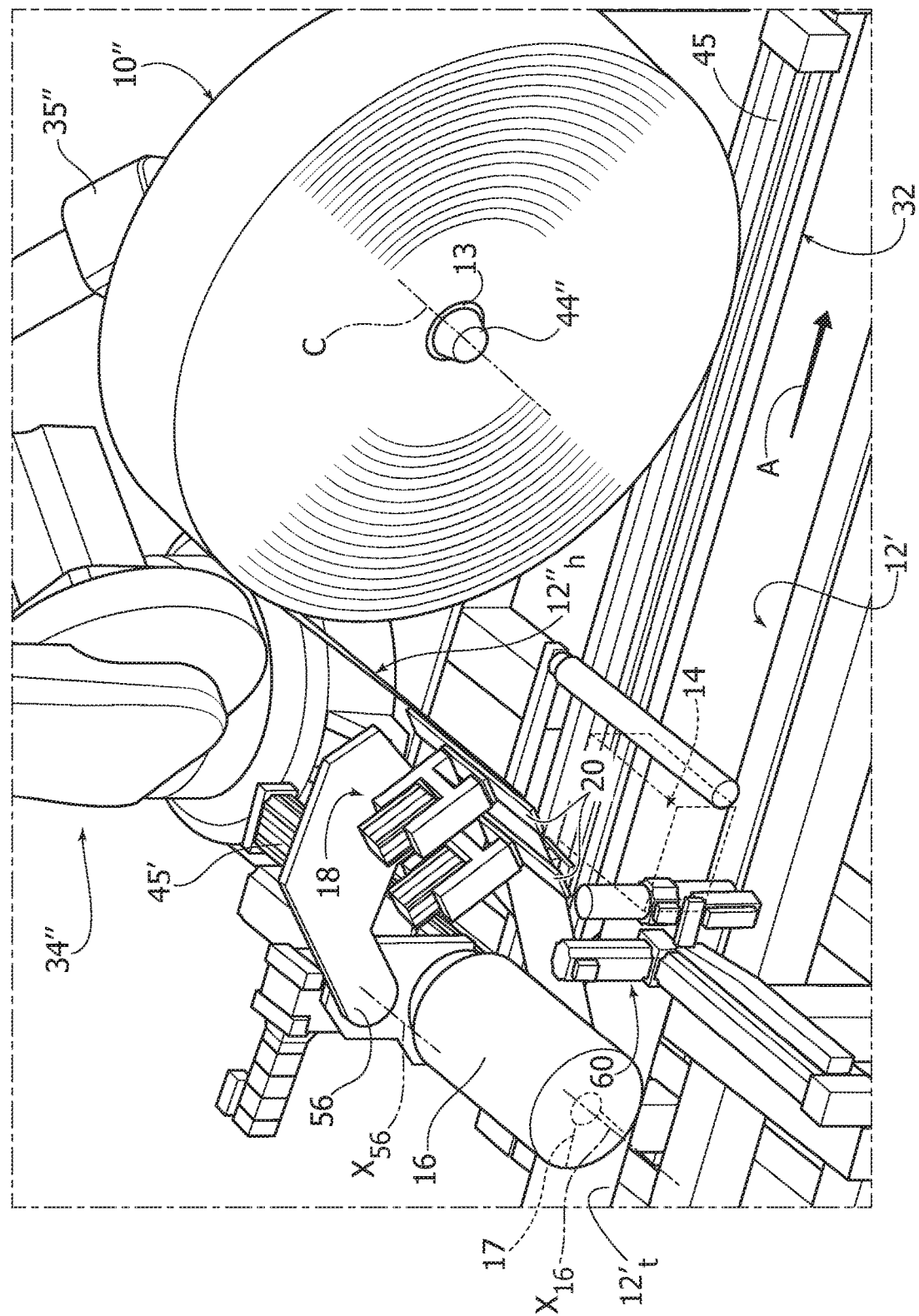
Figure 9:
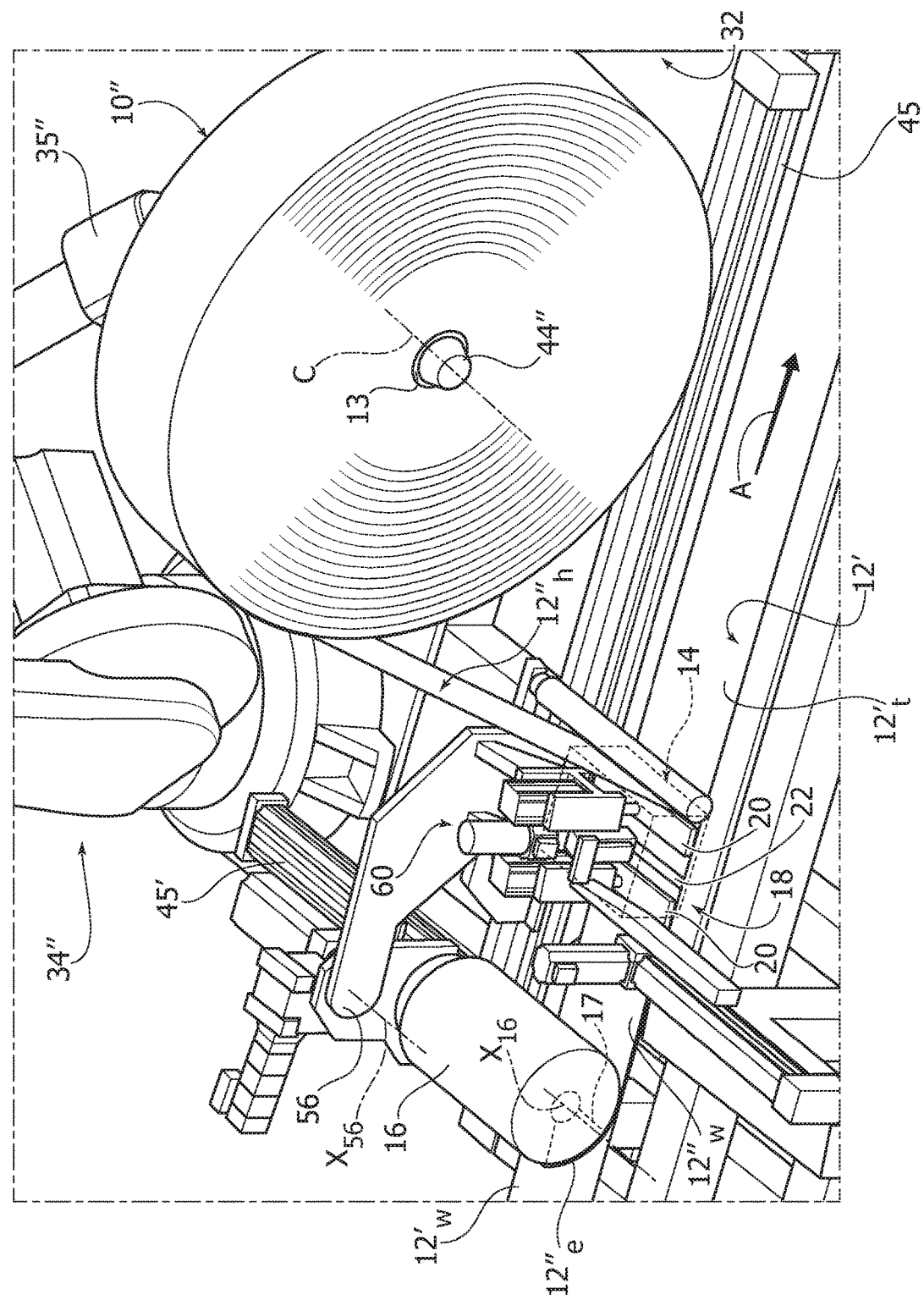

FIGS. 7, 8 and 9 illustrate some details of the unwinding assembly 30 during the reel-change operation. In particular, in FIG. 7 it can be seen that, in one or more embodiments, the gripping element 16 and the positioning element 18 can be carried by a first slide 45 which allows displacements with respect to the base frame 32 along a direction parallel to the feed direction A of the web 12'. The gripping element 16 and the positioning element 18, moreover, are typically mounted on a second slide 45' which allows it to move along a transverse direction with respect to the feed direction A of the web in order to take, as previously explained, both the gripping element 16 and the positioning element 18 into a rest position after completion of the joining operations, so as not to obstruct the path of the web 12', 12" during the movement of the new reel 10', 10" from the waiting position to the unwinding position.

In one or more embodiments, the positioning element 18 that overlaps a portion of the head section 12"h with a portion of the tail section 12't may comprise an arm 56 carrying the transverse bars 20 that come into contact with the head section 12"h. In one or more embodiments, the arm 56 of the positioning element 18 can be pivoted about an axis X56, parallel to the axis X16 of the gripping element 16. In additional embodiments, the arm 56 can be articulated about the rotation axis X16 of the gripping element 16. FIG. 8 illustrates the step in which the positioning element 18 has come into contact with a portion of the head section 12"h during its rotation towards the junction zone 14. FIG. 9 shows the positioning element 18 at the end of the rotation of the arm 56 towards the junction zone 14, which overlaps a portion of the head section 12"h with a portion of the tail section 12't in the junction zone 14.

FIGS. 7, 8 and 9 illustrate a cutting and welding unit 60 that carries out the transverse welding of the two web sections 12"h and 12't overlapped on each other in the junction zone 14. The welding and cutting unit 60 also carries out the transverse cutting of the web sections 12"h, 12't. As already described above, the transverse cut may be carried out on the transverse junction band 22 to separate the waste portions 12'w, 12"w located upstream of the junction zone 14 from the webs 12', 12". In one or more embodiments, the welding and cutting unit 60 may be displaceable with respect to the base 32 along a direction transverse to the feed direction A of the web, in such a way that the welding and cutting unit 60 can be moved at the end of the joining and cutting operation into a resting position outside the working area of the webs.

One or more embodiments may have one or more of the following advantages:

the junction between the two webs is carried out under stationary conditions, between portions of the two straight webs that overlap each other, which simplifies the joining operation and reduces risks of malfunctions and the intervention of personnel;

the waste portions of the first and second webs are both located upstream of the junction zone, so that their collection is easy and does not involve risks of malfunctions;

the waste portions of the first and second webs can be joined together and can be collected together on the core 13 of the finished reel;

the junction between the two webs can be made using any technology, such as thermal welding, ultrasonic welding, gluing with glue, gluing with double-sided tape, and can be performed using standard devices;

the junction zone between the two webs can be very small, which reduces the waste products;

the manipulators that carry the unwinding device 40 for gripping, handling and unwinding the reels can be standard Cartesian or anthropomorphic industrial robots; and the method and the unwinding assembly can be easily adapted to reels with any width and diameter.

The unwinding assembly 30, besides solving the technical problems previously stated and offering the advantages listed above, solves further technical problems. In fact, in order to be able to pick up a reel 10', 10" from the pile 33', 33", the unwinding and handling unit 34', 34" typically moves the vision device 50', 50" around the new reel 10', 10" for detecting the position of the strip of adhesive tape 52 and determining its outer diameter. During this inspection step, the camera 50', 50" can also identify the label placed on the reel by the manufacturer of raw materials, which in some cases may coincide with the adhesive tape 52. Therefore, the electronic control unit 70 can convert the high speed and resolution camera 50', 50" to make it work like a normal camera and/or as a barcode or data matrix reader and, once the inspection operation is completed, it is possible to take a photo of the label affixed by the manufacturer and, moreover, by arranging the camera in its code reader function, it is possible to read the data of the new reel 10', 10" and store it in a suitable device of data storage that may be an internal memory disk of the electronic control unit 70 or connected to the network.

Of course, without prejudice to the underlying principles of the invention, the details of construction and the embodiments may vary, even significantly, with respect to those illustrated here, purely by way of non-limiting example, without departing from the scope of the invention.

This field of protection is defined by the attached claims.

The invention claimed is:

1. An unwinding and handling unit of a reel containing a web designed to feed a production machine, comprising a robot provided with at least one arm, a wrist that is pivotable with respect to the arm, an electronic control unit that controls the wrist, a vision device configured to acquire images usable by the electronic control unit, and an unwinding device mounted on the wrist, wherein:
   said unwinding device comprises a support fixed to the wrist, and an unwinding shaft rotatable about an axis driven by an electric motor, wherein said electric motor has a rotation axis perpendicular to the axis, and the unwinding shaft includes a plurality of mobile expansion elements projecting from an outer surface of the unwinding shaft:
   the vision device is mounted to the support; and
   the electronic control unit is programmed to:
      move of the wrist to insert the unwinding shaft inside an opening of a central core of the reel,
      push the mobile expansion elements outwards to lock the reel on the unwinding shaft,
      detect images of an outer surface of the reel acquired with the vision device, and
      process the images of the outer surface of the reel to determine the angular position of a strip of adhesive tape that joins a head end of the web wound onto the reel to the outer surface of the reel.

2. A unit according to claim 1, wherein the plurality of mobile expansion elements are configured to move outwards by means of pressurized air.

3. A unit according to claim 1, wherein the unwinding device comprises an encoder that detects the angular position and instantaneous speed of the unwinding shaft.

4. A unit according to claim 1, wherein the robot is an anthropomorphic robot.

5. A method for automatically loading reels onto an unwinding assembly comprising a first and a second unwinding and handling unit comprising respective robots each having at least one respective arm and at least one respective wrist movable under the control of at least one electronic control unit, the at least one respective wrist being pivotable with respect to the at least one respective arm, wherein each of the unwinding and handling units comprises a respective unwinding device mounted on the wrist of the respective robot comprising a support fixed to the respective wrist and carrying a respective unwinding shaft rotating about a respective axis, wherein each of the unwinding shafts comprises a plurality of mobile expansion elements projecting from an outer surface of the unwinding shaft, wherein the method comprises:
   arranging a plurality of reels in a storage area having respective central cores provided with respective openings,
   moving the wrist of one of the robots under the control of the at least one electronic control unit and inserting the respective unwinding shaft inside one of the respective openings;
   pushing the mobile expansion elements outwards to lock the reel on the respective unwinding shaft;
   detecting images of a reel with a vision device carried by the support; and
   processing the images of the outer surface of said reel with the at least one electronic control unit and determining the angular position of a strip of adhesive tape that joins a head end of a web wound onto said reel to the outer surface of the reel.

6. A method according to claim 5, comprising:
acquiring images, with the vision device, of an opening of a central core of a reel located in said storage area; and
controlling the movement of the wrist of one of the robots with the at least one electronic control unit to guide the insertion of the respective unwinding shaft inside the opening on the basis of the images of the opening.

7. A method according to claim 6, comprising:
moving one of the unwinding devices about a reel located in the storage area; and
acquiring images of an outer surface of the reel with the vision device.

8. A method according to claim 7, comprising:
moving one of the unwinding devices about a reel located in the storage area;
acquiring, with the vision device, images of a label containing data of the material wound onto the reel, and
processing the images of the label with the at least one electronic control unit and acquiring the data of the material wound onto the reel.

* * * * *